United States Patent
Zheng et al.

(10) Patent No.: US 10,411,860 B2
(45) Date of Patent: Sep. 10, 2019

(54) INFORMATION TRANSMISSION METHOD, BASE STATION, AND USER EQUIPMENT

(71) Applicant: Huawei Technologies Co., Ltd., Shenzhen (CN)

(72) Inventors: Juan Zheng, Beijing (CN); Zhiyu Yan, Beijing (CN); Sha Ma, Beijing (CN); Qiang Li, Doha (QA)

(73) Assignee: Huawei Technologies Co., Ltd., Shenzhen (CN)

( * ) Notice: Subject to any disclaimer, the term of this patent is extended or adjusted under 35 U.S.C. 154(b) by 467 days.

(21) Appl. No.: 15/085,469

(22) Filed: Mar. 30, 2016

(65) Prior Publication Data
US 2016/0218847 A1    Jul. 28, 2016

Related U.S. Application Data

(63) Continuation of application No. PCT/CN2013/084709, filed on Sep. 30, 2013.

(51) Int. Cl.
*H04L 12/24* (2006.01)
*H04W 72/04* (2009.01)
(Continued)

(52) U.S. Cl.
CPC ........ *H04L 5/0053* (2013.01); *H04L 41/0806* (2013.01); *H04W 24/10* (2013.01); *H04W 68/025* (2013.01); *H04W 72/042* (2013.01); *H04W 76/10* (2018.02); *H04W 72/0453* (2013.01); *H04W 88/08* (2013.01)

(58) Field of Classification Search
CPC .. H04L 41/0806; H04L 5/0053; H04W 24/10; H04W 72/042; H04W 72/0453; H04W 76/02; H04W 88/08
See application file for complete search history.

(56) References Cited

U.S. PATENT DOCUMENTS

2010/0189053 A1   7/2010   Birru et al.
2010/0279725 A1   11/2010   Muraoka et al.
(Continued)

FOREIGN PATENT DOCUMENTS

CN    102754457 A    10/2012
CN    102892198 A    1/2013
(Continued)

OTHER PUBLICATIONS

Nokia, et al. "E-PDCCH design principles," 3GPP TSG RAN WG1 Meeting #67 R1-114329, Nov. 14-18, 2011, San Francisco, CA, USA, 4 pages.

*Primary Examiner* — Andrew Lai
*Assistant Examiner* — M Mostazir Rahman
(74) *Attorney, Agent, or Firm* — Slater Matsil, LLP

(57) ABSTRACT

Embodiments provide an information transmission method, a base station, and user equipment, so as to properly use a spectrum. The method includes generating a first notification message, where the first notification message is used to instruct user equipment in a user equipment set to detect a common control channel of a first cell in the first cell, and sending the first notification message to the user equipment in the user equipment set by using a second cell. The method also includes sending the common control channel to the user equipment in the user equipment set by using the first cell.

20 Claims, 12 Drawing Sheets

100

Generate a first notification message, where the first notification message is used to instruct user equipment in a user equipment set to detect a common control channel of a first cell in the first cell — S110

Send the first notification message to the user equipment in the user equipment set by using a second cell — S120

Send the common control channel to the user equipment in the user equipment set by using a first cell — S130

(51) Int. Cl.
*H04L 5/00* (2006.01)
*H04W 76/10* (2018.01)
*H04W 24/10* (2009.01)
*H04W 68/02* (2009.01)
*H04W 88/08* (2009.01)

(56) References Cited

U.S. PATENT DOCUMENTS

| | | | |
|---|---|---|---|
| 2011/0110321 A1 | 5/2011 | Kishiyama et al. | |
| 2011/0199986 A1* | 8/2011 | Fong | H04L 5/0035 |
| | | | 370/329 |
| 2011/0274066 A1 | 11/2011 | Tee et al. | |
| 2012/0270555 A1* | 10/2012 | Wei | H04W 48/08 |
| | | | 455/450 |
| 2013/0195032 A1 | 8/2013 | Göransson et al. | |
| 2014/0112289 A1 | 4/2014 | Kim et al. | |
| 2015/0236773 A1* | 8/2015 | Kim | H04B 7/0626 |
| | | | 375/295 |

FOREIGN PATENT DOCUMENTS

| | | | |
|---|---|---|---|
| JP | 2009267990 A | 11/2009 | |
| JP | 2010519817 A | 6/2010 | |
| WO | 2009084463 A1 | 7/2009 | |
| WO | 2012177204 A1 | 12/2012 | |
| WO | 2013006006 A2 | 1/2013 | |
| WO | 2013006988 A1 | 1/2013 | |

* cited by examiner

INFORMATION TRANSMISSION METHOD, BASE STATION, AND USER EQUIPMENT

This application is a continuation of International Application No. PCT/CN2013/084709, filed on Sep. 30, 2013, which is hereby incorporated by reference in its entirety.

TECHNICAL FIELD

The present invention relates to the communications field, and in particular, to an information transmission method, a base station, and user equipment.

BACKGROUND

A spectrum is a basis of radio communication. Currently, there is a design for spectrum utilization, that is, a device in a Long Term Evolution (LTE) system and a device in a non-LTE system (such as a wireless fidelity (WiFi) device) may jointly use a shared spectrum. Specifically, in the LTE system, the shared spectrum may be used in a form of cell configuration. However, how to properly use the shared spectrum in the form of cell configuration is an urgent problem to be resolved.

SUMMARY

Embodiments provide an information transmission method, a base station, and user equipment, so as to properly use a shared spectrum in a form of cell configuration.

According to a first aspect, an information transmission method is provided. The method includes generating a first notification message, where the first notification message is used to instruct user equipment in a user equipment set to detect a common control channel of a first cell in the first cell. The method also includes sending the first notification message to the user equipment in the user equipment set by using a second cell; and sending the common control channel to the user equipment in the user equipment set by using the first cell.

With reference to the first aspect, in a first possible implementation manner of the first aspect, before the sending the first notification message to the user equipment in the user equipment set by using a second cell, the method further includes: determining that the first cell is in an available state.

With reference to the first possible implementation manner of the first aspect, in a second possible implementation manner of the first aspect, after the determining that the first cell is in an available state, the method further includes: sending a preoccupied signal over the first cell.

With reference to the first or the second possible implementation manner of the first aspect, in a third possible implementation manner of the first aspect, the determining that the first cell is in an available state includes: determining, by means of energy detection and/or by means of signal parsing, that the first cell is in an available state.

With reference to the first or the second possible implementation manner of the first aspect, in a fourth possible implementation manner of the first aspect, the method further includes: receiving a listening report message sent by first user equipment in the user equipment set when the first user equipment determines, according to energy detection and/or signal parsing, that the first cell is in an available state. The determining that the first cell is in an available state includes: determining, according to the listening report message, that the first cell is in an available state.

With reference to the first aspect or any one of the first to the fourth possible implementation manners of the first aspect, in a fifth possible implementation manner of the first aspect, before the sending the first notification message to the user equipment in the user equipment set by using a second cell, the method further includes: determining that service data needs to be sent to the user equipment in the user equipment set by using the first cell. After the sending the common control channel to the user equipment in the user equipment set, the method further includes: sending the service data to the user equipment in the user equipment set by using the first cell.

With reference to the first aspect or any one of the first to the fifth possible implementation manners of the first aspect, in a sixth possible implementation manner of the first aspect, when the common control channel includes a synchronization channel, and it is determined that synchronization performance of the user equipment in the user equipment set cannot meet a synchronization requirement, the method further includes: generating a second notification message, where the second notification message is used to instruct the user equipment in the user equipment set to detect the synchronization channel of the first cell in the first cell; sending the second notification message to the user equipment in the user equipment set by using the second cell; and sending the synchronization channel to the user equipment in the user equipment set by using the first cell.

With reference to the first aspect or any one of the first to the sixth possible implementation manners of the first aspect, in a seventh possible implementation manner of the first aspect, when common control information carried over the common control channel is updated, the method further includes: generating a third notification message, where the third notification message is used to instruct the user equipment in the user equipment set to detect an updated common control channel in the first cell, and the updated common control channel is used to carry updated common control information; sending the third notification message to the user equipment in the user equipment set by using the second cell; and sending the updated common control channel to the user equipment in the user equipment set by using the first cell.

With reference to the first aspect or any one of the first to the fifth possible implementation manners of the first aspect, in an eighth possible implementation manner of the first aspect, the sending the common control channel to the user equipment in the user equipment set includes: periodically sending the common control channel to the user equipment in the user equipment set; and the method further includes: when it is determined that the first cell is occupied by another device, generating a stop detection message, where the stop detection message is used to instruct the user equipment in the user equipment set to stop detecting the common control channel; and sending the stop detection message to the user equipment in the user equipment set by using the second cell.

With reference to the eighth possible implementation manner of the first aspect, in a ninth possible implementation manner of the first aspect, after the sending the stop detection message to the user equipment in the user equipment set by using the second cell, the method further includes: determining that the first cell is in an available state; generating a fourth notification message, where the fourth notification message is used to instruct the user equipment in the user equipment set to detect the common control channel of the first cell in the first cell; sending the fourth notification message to the user equipment in the user equipment set by using the second cell; and periodically sending the common control channel to the user equipment in the user equipment set by using the first cell.

With reference to the first aspect or any one of the first to the ninth possible implementation manners of the first aspect, in a tenth possible implementation manner of the first aspect, the first notification message includes information required for demodulating the common control channel.

With reference to the first aspect or any one of the first to the tenth possible implementation manners of the first aspect, in an eleventh possible implementation manner of the first aspect, the common control channel includes at least one of the synchronization channel, a physical broadcast channel, a common control channel that carries a system information block, and a common control channel that carries a reference signal for performing measurement.

With reference to the first aspect or any one of the first to the eleventh possible implementation manners of the first aspect, in a twelfth possible implementation manner of the first aspect, the first notification message is carried by using physical layer signaling, and is carried in common search space of the second cell; or the first notification message is carried by using physical layer signaling, and is carried in user equipment-specific search space in the user equipment set.

With reference to the first aspect or any one of the first to the twelfth possible implementation manners of the first aspect, in a thirteenth possible implementation manner of the first aspect, the sending the first notification message to the user equipment in the user equipment set by using a second cell includes: sending the first notification message to the user equipment in the user equipment set by using a spectrum corresponding to the second cell, where the spectrum corresponding to the second cell is a licensed spectrum; and/or the sending the common control channel to the user equipment in the user equipment set by using the first cell includes: sending the common control channel to the user equipment in the user equipment set by using a spectrum corresponding to the first cell, where the spectrum corresponding to the first cell is an unlicensed spectrum.

According to a second aspect, an information transmission method is provided. The method includes: receiving a first notification message sent by a base station over a second cell, where the first notification message is used to instruct to detect a common control channel of a first cell in the first cell, and determining, based on the first notification message, that the common control channel needs to be detected in the first cell; and detecting the common control channel in the first cell.

With reference to the second aspect, in a first possible implementation manner of the second aspect, the receiving a first notification message sent by a base station over a second cell includes: receiving the first notification message sent by the base station when the base station determines that the first cell is in an available state.

With reference to the first possible implementation manner of the second aspect, in a second possible implementation manner of the second aspect, before the receiving a first notification message sent by a base station over a second cell, the method further includes: determining, according to energy detection and/or signal parsing, that the first cell is in an available state, generating a listening report message, where the listening report message is used by the base station to determine that the first cell is in an available state, and sending the listening report message to the base station.

With reference to the second aspect, or the first or the second possible implementation manner of the second aspect, in a third possible implementation manner of the second aspect, the method further includes: receiving, over the first cell, service data sent by the base station.

With reference to the second aspect or any one of the first to the third possible implementation manners of the second aspect, in a fourth possible implementation manner of the second aspect, the method further includes: receiving a second notification message sent by the base station over the second cell, where the second notification message is sent by the base station when the base station determines that synchronization performance of user equipment cannot meet a synchronization requirement, and is used to instruct to detect a synchronization channel of the first cell in the first cell; and detecting the synchronization channel of the first cell in the first cell based on the second notification message.

With reference to the second aspect or any one of the first to the fourth possible implementation manners of the second aspect, in a fifth possible implementation manner of the second aspect, the method further includes: receiving a third notification message sent by the base station over the second cell, where the third notification message is sent by the base station when the base station determines that common control information carried over the common control channel is updated, and the third notification message is used to instruct to detect an updated common control channel of the first cell in the first cell, and the updated common control channel is used to carry updated common control information; and detecting the updated common control channel in the first cell based on the third notification message.

With reference to the second aspect or any one of the first to the third possible implementation manners of the second aspect, in a sixth possible implementation manner of the second aspect, the detecting the common control channel in the first cell includes: periodically detecting the common control channel in the first cell; receiving a stop detection message sent by the base station over the second cell, where the stop detection message is sent by the base station when the base station determines that the first cell is occupied by another device, and is used to instruct to stop detecting the common control channel; and stopping, based on the stop detection message, detecting the common control channel in the first cell.

With reference to the sixth possible implementation manner of the second aspect, in a seventh possible implementation manner of the second aspect, after the stopping detecting the common control channel in the first cell, the method further includes: receiving a fourth notification message sent by the base station when the base station determines that the first cell is in an available state, where the fourth notification message is used to instruct to detect the common control channel of the first cell in the first cell; and periodically detecting the common control channel in the first cell based on the fourth notification message.

With reference to the second aspect or any one of the first to the seventh possible implementation manners of the second aspect, in an eighth possible implementation manner of the second aspect, the first notification message carries information required for demodulating the common control channel. The determining that the common control channel needs to be detected in the first cell includes: determining that the common control channel needs to be detected in the first cell based on the information required for demodulating the common control channel. The detecting the common control channel in the first cell includes: detecting the common control channel in the first cell based on the information required for demodulating the common control channel.

With reference to the second aspect or any one of the first to the seventh possible implementation manners of the second aspect, in a ninth possible implementation manner of the second aspect, the detecting the common control channel in the first cell includes: detecting the common control channel in the first cell by means of blind detection.

With reference to the second aspect or any one of the first to the ninth possible implementation manners of the second aspect, in a tenth possible implementation manner of the second aspect, the common control channel includes at least one of the synchronization channel, a physical broadcast channel, a common control channel that carries a system information block, and a common control channel that carries a reference signal for performing measurement.

With reference to the tenth possible implementation manner of the second aspect, in an eleventh possible implementation manner of the second aspect, when the common control channel includes the common control channel that carries the reference signal for performing measurement, the method further includes: performing channel state information CSI measurement and/or radio resource management RRM measurement according to the reference signal for performing measurement.

With reference to the second aspect or any one of the first to the eleventh possible implementation manners of the second aspect, in a twelfth possible implementation manner of the second aspect, the first notification message is carried by using physical layer signaling, and is carried in common search space of the second cell; or the first notification message is carried by using physical layer signaling, and is carried in user equipment-specific search space.

With reference to the second aspect or any one of the first to the twelfth possible implementation manners of the second aspect, in a thirteenth possible implementation manner of the second aspect, the receiving a first notification message sent by a base station over a second cell includes: receiving the first notification message sent by the base station on a spectrum corresponding to the second cell, where the spectrum corresponding to the second cell is a licensed spectrum; and/or the determining that the common control channel needs to be detected in the first cell includes: determining that the common control channel needs to be detected on a spectrum corresponding to the first cell; and the detecting the common control channel in the first cell includes: detecting the common control channel on the spectrum corresponding to the first cell, where the spectrum corresponding to the first cell is an unlicensed spectrum.

According to a third aspect, a base station is provided. The base station includes a generation unit, configured to generate a first notification message, where the first notification message is used to instruct user equipment in a user equipment set to detect a common control channel of a first cell in the first cell. The base station also includes a sending unit, configured to send, by using a second cell, the first notification message generated by the generation unit to the user equipment in the user equipment set. The sending unit is further configured to send the common control channel to the user equipment in the user equipment set by using the first cell.

With reference to the third aspect, in a first possible implementation manner of the third aspect, the first determining unit is configured to: before the sending unit sends the first notification message to the user equipment in the user equipment set by using the second cell, determine that the first cell is in an available state.

With reference to the first possible implementation manner of the third aspect, in a second possible implementation manner of the third aspect, the sending unit is further configured to: after the first determining unit determines that the first cell is in an available state, send a preoccupied signal over the first cell.

With reference to the first or the second possible implementation manner of the third aspect, in a third possible implementation manner of the third aspect, the base station further includes a receiving unit, and the first determining unit is specifically configured to determine, by performing energy detection and/or signal parsing on a signal received by the receiving unit, that the first cell is in an available state.

With reference to the first or the second possible implementation manner of the third aspect, in a fourth possible implementation manner of the third aspect, the base station further includes: a receiving unit, configured to receive a listening report message sent by first user equipment in the user equipment set when the first user equipment determines, according to energy detection and/or signal parsing, that the first cell is in an available state. The first determining unit is specifically configured to determine, according to the listening report message received by the receiving unit, that the first cell is in an available state.

With reference to the third aspect or any one of the first to the fourth possible implementation manners of the third aspect, in a fifth possible implementation manner of the third aspect, the base station further includes a second determining unit, and the second determining unit is specifically configured to: before the sending unit sends the first notification message to the user equipment in the user equipment set by using the second cell, determine that the sending unit needs to send service data to the user equipment in the user equipment set by using the first cell; and the sending unit is further configured to: after sending the common control channel to the user equipment in the user equipment set, send the service data to the user equipment in the user equipment set by using the first cell.

With reference to the third aspect or any one of the first to the fifth possible implementation manners of the third aspect, in a sixth possible implementation manner of the third aspect, the base station further includes a third determining unit, and the third determining unit is configured to: when the common control channel includes a synchronization channel, determine whether synchronization performance of the user equipment in the user equipment set can meet a synchronization requirement; the generation unit is further configured to: when the third determining unit determines that the synchronization performance of the user equipment in the user equipment set cannot meet the synchronization requirement, generate a second notification message, where the second notification message is used to instruct the user equipment in the user equipment set to detect the synchronization channel of the first cell in the first cell; and the sending unit is further configured to send, by using the second cell, the second notification message generated by the generation unit to the user equipment in the user equipment set, and send the synchronization channel to the user equipment in the user equipment set by using the first cell.

With reference to the third aspect or any one of the first to the sixth possible implementation manners of the third aspect, in a seventh possible implementation manner of the third aspect, the base station further includes a fourth determining unit, and the fourth determining unit is configured to determine that common control information carried over the common control channel is updated. The generation unit is further configured to: after the fourth determining unit determines that the common control information carried over the common control channel is updated, generate a third notification message, where the third notification message is used to instruct the user equipment in the user equipment set to detect an updated common control channel of the first cell in the first cell, and the updated common control channel is used to carry updated common control information; and the sending unit is further configured to send, by using the second cell, the third notification message generated by the generation unit to the user equipment in the user equipment set, and send the updated common control channel to the user equipment in the user equipment set by using the first cell.

With reference to the third aspect or any one of the first to the fifth possible implementation manners of the third aspect, in an eighth possible implementation manner of the third aspect, the sending unit is specifically configured to periodically send the common control channel to the user equipment in the user equipment set; the generation unit is further configured to: when the first determining unit determines that the first cell is occupied by another device, generate a stop detection message, where the stop detection message is used to instruct the user equipment in the user equipment set to stop detecting the common control channel. The sending unit is further configured to send the stop detection message to the user equipment in the user equipment set by using the second cell.

With reference to the eighth possible implementation manner of the third aspect, in a ninth possible implementation manner of the third aspect, the generation unit is further configured to: after the sending unit sends the stop detection message, and the first determining unit determines that the first cell is in an available state, generate a fourth notification message, where the four notification message is used to instruct the user equipment in the user equipment set to detect the common control channel of the first cell in the first cell. The sending unit is further configured to send the fourth notification message generated by the generation unit, and periodically send the common control channel to the user equipment in the user equipment set by using the first cell.

With reference to the third aspect or any one of the first to the ninth possible implementation manners of the third aspect, in a tenth possible implementation manner of the third aspect, the first notification message generated by the generation unit includes information required for demodulating the common control channel.

With reference to the third aspect or any one of the first to the tenth possible implementation manners of the third aspect, in an eleventh possible implementation manner of the third aspect, the common control channel includes at least one of the synchronization channel, a physical broadcast channel, a common control channel that carries a system information block, and a common control channel that carries a reference signal for performing measurement.

With reference to the third aspect or any one of the first to the eleventh possible implementation manners of the third aspect, in a twelfth possible implementation manner of the third aspect, the first notification message is carried by using physical layer signaling, and is carried in common search space of the second cell; or the first notification message is carried by using physical layer signaling, and is carried in user equipment-specific search space in the user equipment set.

With reference to the third aspect or any one of the first to the twelfth possible implementation manners of the third aspect, in a thirteenth possible implementation manner of the third aspect, the sending unit is specifically configured to send, by using a spectrum corresponding to the second cell, the first notification message generated by the generation unit to the user equipment in the user equipment set, where the spectrum corresponding to the second cell is a licensed spectrum; and/or the sending unit is specifically configured to send the common control channel to the user equipment in the user equipment set by using a spectrum corresponding to the first cell, where the spectrum corresponding to the first cell is an unlicensed spectrum.

According to a fourth aspect, user equipment is provided. The user equipment includes a receiving unit, configured to receive a first notification message sent by a base station over a second cell, where the first notification message is used to instruct to detect a common control channel of a first cell in the first cell. The user equipment also includes a determining unit, configured to determine, based on the first notification message received by the receiving unit, that a detection unit needs to detect the common control channel in the first cell. The user equipment also includes the detection unit, configured to detect the common control channel in the first cell.

With reference to the fourth aspect, in a first possible implementation manner of the fourth aspect, the receiving unit is specifically configured to receive the first notification message sent by the base station when the base station determines that the first cell is in an available state.

With reference to the first possible implementation manner of the fourth aspect, in a second possible implementation manner of the fourth aspect, the determining unit is further configured to determine, according to energy detection and/or signal parsing, that the first cell is in an available state; and the user equipment further includes a generation unit and a sending unit. The generation unit is configured to: after the determining unit determines that the first cell is in an available state, generate a listening report message, where the listening report message is used by the base station to determine that the first cell is in an available state. The sending unit is configured to send the listening report message generated by the generation unit to the base station.

With reference to the fourth aspect, or the first or the second possible implementation manner of the fourth aspect, in a third possible implementation manner of the fourth aspect, the receiving unit is further configured to receive, over the first cell, service data sent by the base station.

With reference to the fourth aspect or any one of the first to the third possible implementation manners of the fourth aspect, in a fourth possible implementation manner of the fourth aspect, the receiving unit is further configured to receive a second notification message sent by the base station on a spectrum corresponding to the first cell, where the second notification message is sent by the base station when the base station determines that synchronization performance of the user equipment cannot meet a synchronization requirement, and is used to instruct to detect a synchronization channel of a spectrum corresponding to the second cell on the spectrum corresponding to the second cell; the determining unit is further configured to determine, based on the second notification message received by the receiving unit, that the detection unit needs to detect the synchronization channel of the spectrum corresponding to the second cell on the spectrum corresponding to the second cell; and the detection unit is further configured to detect the synchronization channel of the spectrum corresponding to the second cell on the spectrum corresponding to the second cell.

With reference to the fourth aspect or any one of the first to the fourth possible implementation manners of the fourth aspect, in a fifth possible implementation manner of the fourth aspect, the receiving unit is further configured to receive a third notification message sent by the base station over the second cell, where the third notification message is sent by the base station when the base station determines that common control information carried over the common control channel is updated, and the third notification message is used to instruct to detect an updated common control channel of the first cell in the first cell, and the updated common control channel is used to carry updated common control information; the determining unit is further configured to determine, based on the third notification message received by the receiving unit, that the detection unit needs to detect the updated common control channel in the first cell; and the detection unit is further configured to detect the updated common control channel in the first cell.

With reference to the fourth aspect or any one of the first to the third possible implementation manners of the fourth aspect, in a sixth possible implementation manner of the fourth aspect, the detection unit is specifically configured to periodically detect the common control channel in the first cell based on the first notification message received by the receiving unit; the receiving unit is further configured to receive a stop detection message sent by the base station over the second cell, where the stop detection message is sent by the base station when the base station determines that the first cell is occupied by another device, and is used to instruct to stop detecting the common control channel. The determining unit is further configured to determine, based on the stop detection message received by the receiving unit, that the detection unit needs to stop detecting the common control channel in the first cell. The detection unit is further configured to stop detecting the common control channel in the first cell.

With reference to the sixth possible implementation manner of the fourth aspect, in a seventh possible implementation manner of the fourth aspect, the receiving unit is further configured to: after detecting the common control channel stops in the first cell, receive a fourth notification message sent by the base station when the base station determines that the first cell is in an available state, where the fourth notification message is used to instruct to detect the common control channel of the first cell in the first cell; the determining unit is further configured to determine, based on the fourth notification message received by the receiving unit, that the detection unit needs to periodically detect the common control channel in the first cell; and the detection unit is further configured to periodically detect the common control channel in the first cell.

With reference to the fourth aspect or any one of the first to the seventh possible implementation manners of the fourth aspect, in an eighth possible implementation manner of the fourth aspect, the first notification message carries information required for demodulating the common control channel. The determining unit is specifically configured to determine, based on the first notification message, that the detection unit needs to detect the common control channel in the first cell based on the information required for demodulating the common control channel. The detection unit is specifically configured to detect the common control channel in the first cell based on the information required for demodulating the common control channel.

With reference to the fourth aspect or any one of the first to the eighth possible implementation manners of the fourth aspect, in a ninth possible implementation manner of the fourth aspect, the determining unit is configured to determine, based on the first notification message received by the receiving unit, that the detection unit needs to detect the common control channel in the first cell by means of blind detection; and the detection unit is specifically configured to detect the common control channel in the first cell by means of blind detection.

With reference to the fourth aspect or any one of the first to the ninth possible implementation manners of the fourth aspect, in a tenth possible implementation manner of the fourth aspect, the common control channel includes at least one of the synchronization channel, a physical broadcast channel, a common control channel that carries a system information block, and a common control channel that carries a reference signal for performing measurement.

With reference to the tenth possible implementation manner of the fourth aspect, in an eleventh possible implementation manner of the fourth aspect, the user equipment further includes a measurement unit, and the measurement unit is configured to: when the common control channel detected by the detection unit includes the common control channel that carries the reference signal for performing measurement, perform channel state information CSI measurement and/or radio resource management RRM measurement according to the reference signal for performing measurement.

With reference to the fourth aspect or any one of the first to the eleventh possible implementation manners of the fourth aspect, in a twelfth possible implementation manner of the fourth aspect, the first notification message is carried by using physical layer signaling, and is carried in common search space of the second cell; or the first notification message is carried by using physical layer signaling, and is carried in user equipment-specific search space.

With reference to the fourth aspect or any one of the first to the twelfth possible implementation manners of the fourth aspect, in a thirteenth possible implementation manner of the fourth aspect, the receiving unit is specifically configured to receive the first notification message sent by the base station on a spectrum corresponding to the second cell, where the spectrum corresponding to the second cell is a licensed spectrum; and/or the determining unit is specifically configured to determine that the detection unit needs to detect the common control channel on a spectrum corresponding to the first cell; and the detection unit is specifically configured to detect the common control channel on the spectrum corresponding to the first cell, where the spectrum corresponding to the first cell is an unlicensed spectrum.

According to a fifth aspect, a base station is provided, including a processor and a transmitter; where the processor is configured to generate a first notification message, where the first notification message is used to instruct user equipment in a user equipment set to detect a common control channel of a first cell in the first cell. The transmitter is configured to send, by using a second cell, the first notification message generated by the processor to the user equipment in the user equipment set, and send the common control channel to the user equipment in the user equipment set by using the first cell.

With reference to the fifth aspect, in a first possible implementation manner of the fifth aspect, before the transmitter sends the first notification message to the user equipment in the user equipment set by using the second cell, the processor is further configured to determine that the first cell is in an available state.

With reference to the first possible implementation manner of the fifth aspect, in a second possible implementation manner of the fifth aspect, the transmitter is further configured to: after the processor determines that the first cell is in an available state, send a preoccupied signal over the first cell.

With reference to the first or the second possible implementation manner of the fifth aspect, in a third possible implementation manner of the fifth aspect, the base station further includes a receiver, and the processor is specifically configured to determine, by performing energy detection and/or signal parsing on a signal received by the receiver, that the first cell is in an available state.

With reference to the first or the second possible implementation manner of the fifth aspect, in a fourth possible implementation manner of the fifth aspect, the base station further includes a receiver, where the receiver is configured to receive a listening report message sent by first user equipment in the user equipment set when the first user equipment determines, according to energy detection and/or signal parsing, that the first cell is in an available state; and the processor is specifically configured to determine, according to the listening report message received by the receiver, that the first cell is in an available state.

With reference to the fifth aspect or any one of the first to the fourth possible implementation manners of the fifth aspect, in a fifth possible implementation manner of the fifth aspect, the processor is further configured to: before the transmitter sends the first notification message to the user equipment in the user equipment set by using the second cell, determine that service data needs to be sent to the user equipment in the user equipment set by using the first cell; and the transmitter is further configured to: after sending the common control channel to the user equipment in the user equipment set, send the service data to the user equipment in the user equipment set by using the first cell.

With reference to the fifth aspect or any one of the first to the fifth possible implementation manners of the fifth aspect, in a sixth possible implementation manner of the fifth aspect, the processor is further configured to: when the common control channel includes a synchronization channel, determine whether synchronization performance of the user equipment in the user equipment set can meet a synchronization requirement; and when determining that the synchronization performance of the user equipment in the user equipment set cannot meet the synchronization requirement, generate a second notification message, where the second notification message is used to instruct the user equipment in the user equipment set to detect the synchronization channel of the first cell in the first cell; and the transmitter is further configured to send, by using the second cell, the second notification message generated by the processor to the user equipment in the user equipment set, and send the synchronization channel to the user equipment in the user equipment set by using the first cell.

With reference to the fifth aspect or any one of the first to the sixth possible implementation manners of the fifth aspect, in a seventh possible implementation manner of the fifth aspect, the processor is further configured to determine that common control information carried over the common control channel is updated, and generate a third notification message, where the third notification message is used to instruct the user equipment in the user equipment set to detect an updated common control channel of the first cell in the first cell, and the updated common control channel is used to carry updated common control information. The transmitter is further configured to send, by using the second cell, the third notification message generated by the processor to the user equipment in the user equipment set, and send the updated common control channel to the user equipment in the user equipment set by using the first cell.

With reference to the fifth aspect or any one of the first to the fifth possible implementation manners of the fifth aspect, in an eighth possible implementation manner of the fifth aspect, the transmitter is specifically configured to periodically send the common control channel to the user equipment in the user equipment set. The processor is further configured to determine whether the first cell is occupied by another device, and when the processor determines that the first cell is occupied by the another device, generate a stop detection message, where the stop detection message is used to instruct the user equipment in the user equipment set to stop detecting the common control channel. The transmitter is further configured to send, by using the second cell, the stop detection message generated by the processor to the user equipment in the user equipment set.

With reference to the eighth possible implementation manner of the fifth aspect, in a ninth possible implementation manner of the fifth aspect, the processor is further configured to: after the transmitter sends the stop detection message, determine that the first cell is in an available state, and generate a fourth notification message, where the fourth notification message is used to instruct the user equipment in the user equipment set to detect the common control channel of the first cell in the first cell; and the transmitter is further configured to send, by using the second cell, the fourth notification message generated by the processor to the user equipment in the user equipment set, and periodically send the common control channel to the user equipment in the user equipment set by using the first cell.

With reference to the fifth aspect or any one of the first to the ninth possible implementation manners of the fifth aspect, in a tenth possible implementation manner of the fifth aspect, the first notification message generated by the processor includes information required for demodulating the common control channel.

With reference to the fifth aspect or any one of the first to the tenth possible implementation manners of the fifth aspect, in an eleventh possible implementation manner of the fifth aspect, the common control channel includes at least one of the synchronization channel, a physical broadcast channel, a common control channel that carries a system information block, and a common control channel that carries a reference signal for performing measurement.

With reference to the fifth aspect or any one of the first to the eleventh possible implementation manners of the fifth aspect, in a twelfth possible implementation manner of the fifth aspect, the first notification message is carried by using physical layer signaling, and is carried in common search space of the second cell; or the first notification message is carried by using physical layer signaling, and is carried in user equipment-specific search space in the user equipment set.

With reference to the fifth aspect or any one of the first to the twelfth possible implementation manners of the fifth aspect, in a thirteenth possible implementation manner of the fifth aspect, the transmitter is specifically configured to send, by using a spectrum corresponding to the second cell, the first notification message generated by processor to the user equipment in the user equipment set, where the spectrum corresponding to the second cell is a licensed spectrum; and/or the transmitter is specifically configured to send the common control channel to the user equipment in the user equipment set by using a spectrum corresponding to the first cell, where the spectrum corresponding to the first cell is an unlicensed spectrum.

According to a sixth aspect, user equipment is provided. The user equipment includes a receiver, configured to receive a first notification message sent by a base station over a second cell, where the first notification message is used to instruct to detect a common control channel of a first cell in the first cell. The user equipment also includes a processor, configured to determine, based on the first notification message received by the receiver, that the common control channel needs to be detected in the first cell by using the receiver; where the processor is further configured to detect the common control channel in the first cell by using the receiver.

With reference to the sixth aspect, in a first possible implementation manner of the sixth aspect, the receiver is specifically configured to: receive the first notification message sent by the base station when the base station determines that the first cell is in an available state.

With reference to the first possible implementation manner of the sixth aspect, in a second possible implementation manner of the sixth aspect, the processor is further configured to determine, by performing energy detection and/or signal parsing on a signal received by the receiver, that the first cell is in an available state, and generate a listening report message, where the listening report message is used to indicate that the first cell is in an available state; and the user equipment further includes a transmitter, where the transmitter is configured to: when the processor determines that the first cell is in an available state, send the listening report message to the base station.

With reference to the sixth aspect or the first or the second possible implementation manner of the sixth aspect, in a third possible implementation manner of the sixth aspect, the receiver is further configured to receive, over the first cell, service data sent by the base station.

With reference to the sixth aspect or any one of the first to the third possible implementation manners of the sixth aspect, in a fourth possible implementation manner of the sixth aspect, the receiver is further configured to receive a second notification message sent by the base station over the second cell, where the second notification message is sent by the base station when the base station determines that synchronization performance of the user equipment cannot meet a synchronization requirement, and is used to instruct to detect a synchronization channel of the first cell in the first cell. The processor is further configured to determine, based on the second notification message received by the receiver, that the synchronization channel of the first cell needs to be detected in the first cell by using the receiver; and the processor is further configured to detect the synchronization channel of the first cell in the first cell by using the receiver.

With reference to the sixth aspect or any one of the first to the fourth possible implementation manners of the sixth aspect, in a fifth possible implementation manner of the sixth aspect, the receiver is further configured to receive a third notification message sent by the base station over the second cell, where the third notification message is sent by the base station when the base station determines that common control information carried over the common control channel is updated, and the third notification message is used to instruct to detect an updated common control channel of the first cell in the first cell, and the updated common control channel is used to carry updated common control information; the processor is further configured to determine, based on the third notification message received by the receiver, that the updated common control channel needs to be detected in the first cell by using the receiver; and the processor is further configured to detect the updated common control channel of the first cell in the first cell by using the receiver.

With reference to the sixth aspect or any one of the first to the third possible implementation manners of the sixth aspect, in a sixth possible implementation manner of the sixth aspect, the processor is specifically configured to determine, based on the first notification message received by the receiver, that the common control channel needs to be periodically detected in the first cell by using the receiver; the processor is specifically configured to periodically detect the common control channel in the first cell by using the receiver; the receiver is further configured to receive a stop detection message sent by the base station over the second cell, where the stop detection message is sent by the base station when the base station determines that the first cell is occupied by another device, and is used to instruct to stop detecting the common control channel; the processor is further configured to determine, based on the stop detection message received by the receiver, that detecting the common control channel in the first cell by using the receiver needs to stop; and the processor is further configured to stop detecting, by using the receiver, the common control channel in the first cell.

With reference to the sixth possible implementation manner of the sixth aspect, in a seventh possible implementation manner of the sixth aspect, the receiver is further configured to: after the processor stops detecting the common control channel in the first cell by using the receiver, receive a fourth notification message sent by the base station when the base station redetermines that the first cell is in an available state, where the fourth notification message is used to instruct to detect the common control channel of the first cell in the first cell. The processor is further configured to determine, based on the fourth notification message received by the receiver, that the common control channel needs to be periodically detected in the first cell by using the receiver; and the processor is further configured to periodically detect the common control channel in the first cell by using the receiver.

With reference to the sixth aspect or any one of the first to the seventh possible implementation manners of the sixth aspect, in an eighth possible implementation manner of the sixth aspect, the first notification message carries information required for demodulating the common control channel; the processor is specifically configured to determine, based on the first notification message received by the receiver, that the common control channel needs to be detected in the first cell by using the receiver and based on the information required for demodulating the common control channel; and the processor is further specifically configured to detect the common control channel in the first cell by using the receiver and based on the information required for demodulating the common control channel.

With reference to the sixth aspect or any one of the first to the seventh possible implementation manners of the sixth aspect, in a ninth possible implementation manner of the sixth aspect, the processor is specifically configured to detect the common control channel in the first cell by using the receiver, by means of blind detection, and based on the first notification message received by the receiver.

With reference to the sixth aspect or any one of the first to the ninth possible implementation manners of the sixth aspect, in a tenth possible implementation manner of the sixth aspect, the common control channel includes at least one of the synchronization channel, a physical broadcast channel, a common control channel that carries a system information block, and a common control channel that carries a reference signal for performing measurement.

With reference to the tenth possible implementation manner of the sixth aspect, in an eleventh possible implementation manner of the sixth aspect, when the common control channel detected by the processor by using the receiver includes the common control channel that carries the reference signal for performing measurement, the processor is further configured to perform channel state information CSI measurement and/or radio resource management RRM measurement according to the reference signal for performing measurement.

With reference to the sixth aspect or any one of the first to the eleventh possible implementation manners of the sixth aspect, in a twelfth possible implementation manner of the sixth aspect, the first notification message is carried by using physical layer signaling, and is carried in common search space of the second cell; or the first notification message is carried by using physical layer signaling, and is carried in user equipment-specific search space.

With reference to the sixth aspect or any one of the first to the twelfth possible implementation manners of the sixth aspect, in a thirteenth possible implementation manner of the sixth aspect, the receiver is specifically configured to receive the first notification message sent by the base station on a spectrum corresponding to the second cell, where the spectrum corresponding to the second cell is a licensed spectrum; and/or the processor is specifically configured to determine that the common control channel needs to be detected on a spectrum corresponding to the first cell by using the receiver, and detect the common control channel in the first cell by using the receiver, where the spectrum corresponding to the first cell is an unlicensed spectrum.

Therefore, in the embodiments, a notification message used to instruct to detect a common control channel in a first cell is sent to user equipment by using a second cell, which can notify in time the user equipment that the first cell is used, and specifically, notify the user equipment that a base station needs to send the common control channel over the first cell; the base station sends the common control channel over the first cell, so that the user equipment detects the common control channel in the first cell; and the user equipment can acquire common control information of the first cell by demodulating the common control channel, so as to provide necessary information for subsequent possible service data demodulation. Therefore, a shared spectrum can be properly used in a form of cell configuration.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
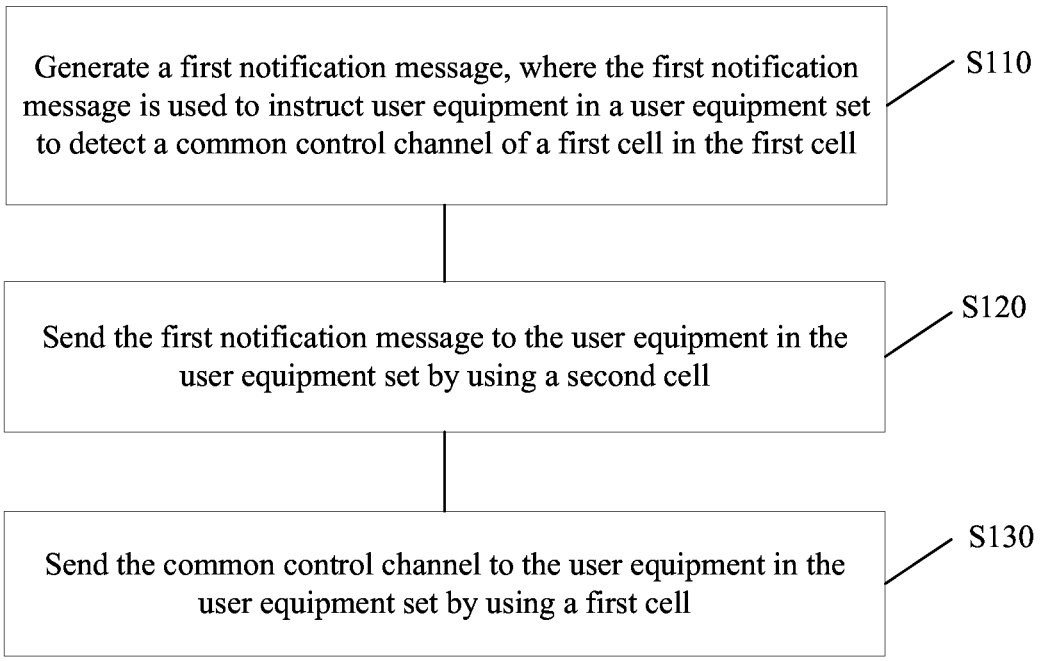
FIG. 1 is a flowchart of an information transmission method according to an embodiment.

FIG. 1 is a schematic flowchart of an information transmission method 100 according to an embodiment. The method 100 may be executed by a base station. As shown in FIG. 1, the method 100 may include the following steps.

S110. Generate a first notification message, where the first notification message is used to instruct user equipment in a user equipment set to detect a common control channel of a first cell in the first cell.

S120. Send the first notification message to the user equipment in the user equipment set by using a second cell.

S130. Send the common control channel to the user equipment in the user equipment set by using the first cell.

When determining that the common control channel of the first cell needs to be sent, the base station may send a notification message to the user equipment in the user equipment set by using the second cell, so as to instruct the user equipment in the user equipment set to detect the common control channel of the first cell in the first cell; and the base station may send the common control channel to the user equipment in the user equipment set by using the first cell, so that the user equipment in the user equipment set can detect the common control channel of the first cell in the first cell according to the notification message. Therefore, a shared spectrum can be properly used in a form of cell configuration.

Therefore, in this embodiment, a notification message used to instruct to detect a common control channel in a first cell is sent to user equipment by using a second cell, which can notify in time the user equipment that the first cell is used, and specifically, notify the user equipment that a base station needs to send the common control channel over the first cell; the base station sends the common control channel over the first cell, so that the user equipment detects the common control channel in the first cell; and the user equipment can acquire common control information of the first cell by demodulating the common control channel, so as to provide necessary information for subsequent possible service data demodulation.

Optionally, the second cell mentioned in this embodiment may be a primary cell (Primary cell, PCell) corresponding to the base station and/or the user equipment, and the first cell may be a secondary cell (Secondary cell, SCell) corresponding to the base station and/or the user equipment. In this embodiment of the present invention, sending a message (which may be specifically a first notification message, a second notification message, a third notification message, a fourth notification message, or a fifth notification message mentioned in the following) by using the second cell is sending the message by using a spectrum corresponding to the second cell. Sending a channel (which may be specifically the common control channel or a channel used to carry service data) by using the first cell is sending the channel by using a spectrum corresponding to the first cell. The spectrum corresponding to the first cell may be an unlicensed (unlicensed) spectrum, and/or the spectrum corresponding to the second cell may be a licensed (licensed) spectrum. The spectrum corresponding to the first cell may be a shared spectrum jointly used by a device in an LTE system and another device, where the another device may be a WiFi device. The unlicensed spectrum may also be understood as a free spectrum, such as a spectrum used by an existing WiFi device. The licensed spectrum may be understood as a sold spectrum.

Optionally, the second cell and the first cell may belong to a same base station. For example, both the second cell and the first cell may belong to a same macro base station. The second cell and the first cell may also belong to different base stations. For example, the second cell belongs to a macro base station, and the first cell belongs to a base station (which is a base station with low transmit power) corresponding to a small cell. The small cell herein may include: a metro cell, a micro cell, a pico cell, a femto cell, a wireless local area network (WLAN) that uses a wireless fidelity (WiFi) technology, and the like. These small cells feature a small coverage area and low transmit power, and are capable of providing a high-speed data transmission service.

When the second cell and the first cell belong to a same base station, the base station may directly configure and/or activate the first cell for the user equipment as a secondary cell; or the base station may configure and/or activate the first cell for the user equipment as a secondary cell after confirming that the first cell is in an available state; or the base station may first configure the first cell for the user equipment as a secondary cell, and then activate the first cell for the user equipment as the secondary cell after determining that the first cell is in an available state. When the second cell and the first cell belong to different base stations, a base station to which the second cell belongs may directly configure and/or activate the first cell for the user equipment as a secondary cell; or a base station to which the second cell belongs may learn, by means of information exchange between the base station to which the second cell belongs and a base station to which the first cell belongs, whether the first cell is in an available state or an unavailable state, and then configure and/or activate the first cell for the user equipment as a secondary cell after determining that the first cell is in an available state; or a base station to which the second cell belongs may first configure the first cell for the user equipment, and then activate the first cell for the user equipment as a secondary cell after determining, by means of information exchange between the base station to which the second cell belongs and a base station to which the first cell belongs, that the first cell is in an available state.

Figure 2:
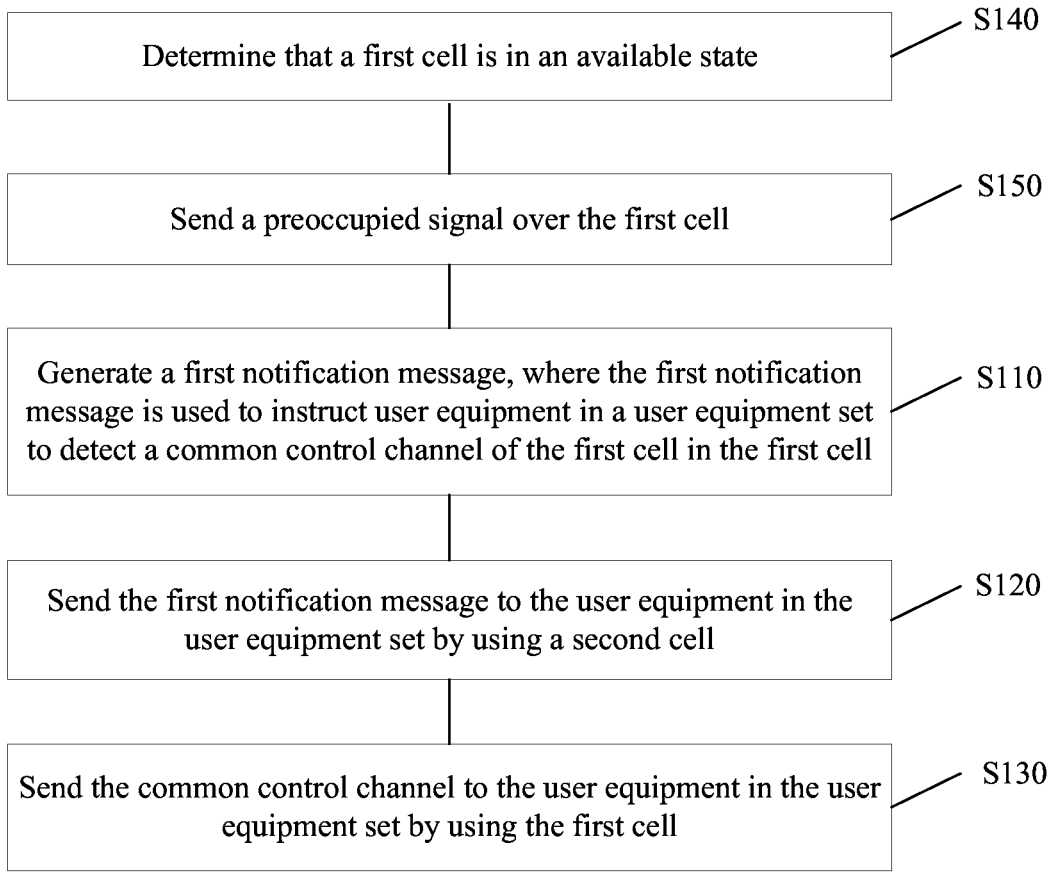
FIG. 2 is a schematic flowchart of an information transmission method according to an embodiment.

In this embodiment, as shown in FIG. 2, before the S120 of sending the first notification message to the user equipment in the user equipment set by using a second cell, the method 100 may further include the following steps.

S140. Determine that the first cell is in an available state.

Therefore, in this embodiment, only when it is determined that a first cell is in an available state, a notification message used to instruct to detect a common control channel in the first cell is sent to user equipment by using a second cell, and the common control channel is sent to the user equipment by using the first cell. Therefore, mutual interference between a base station and another device such as a WiFi device can be avoided, and the another device can also obtain more resource contention opportunities.

Optionally, in this embodiment, as shown in FIG. 2, to avoid that the first cell is occupied again by another device (such as a WiFi device) after it is determined that the first cell is in an available state, after the S140 of determining that the first cell is in an available state, the method 100 may further include the following steps.

S150. Send a preoccupied signal over the first cell, where the preoccupied signal may carry indication information, and the indication information is used to indicate that the first cell is occupied.

Figure 3:
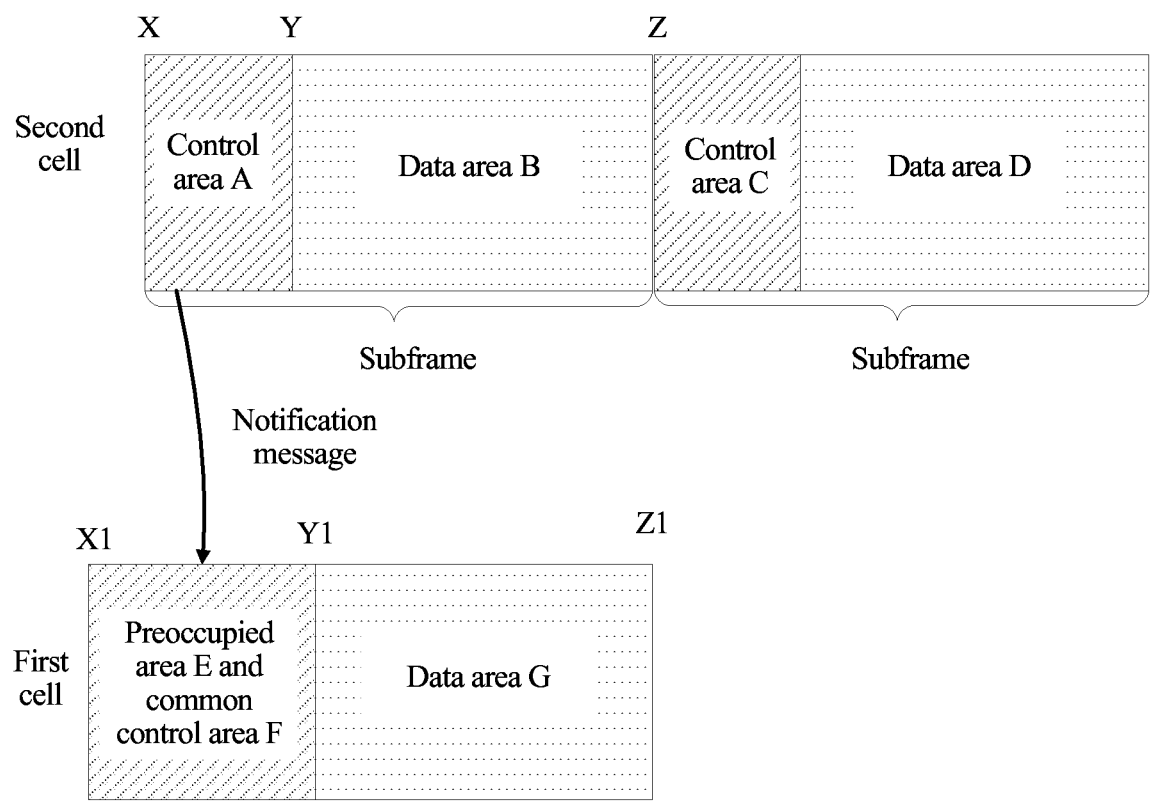
FIG. 3 is a schematic diagram of utilization of time-frequency resources according to another embodiment.

For example, as shown in FIG. 3, after determining that the first cell is in an available state, the base station may first send a preoccupied signal in a preoccupied area E of the first cell, and then the base station may send a notification message to the user equipment in the user equipment set in a control area A of the second cell, where the notification message may be used to instruct the user equipment in the user equipment set to detect the common control channel in a common control area F.

Optionally, in this embodiment, before the notification message is sent to the user equipment in the user equipment set by using the second cell, it may be first determined whether service data needs to be sent to the user equipment in the user equipment set by using the first cell. If channel quality of the first cell is better than channel quality of the second cell, or service load of the second cell is heavier, it may be determined that the service data needs to be sent to the user equipment by using the first cell. After it is determined that the service data needs to be sent by using the first cell, and the common control channel is sent in the common control area F shown in FIG. 3, the service data may be sent to the user equipment in a data area G. Scheduling information about the service data sent in the data area G may be sent by using the data area G, for example, specifically, may be sent by using an enhanced physical downlink control channel (EPDCCH) in the data area G; or may be sent by using a data area B, for example, specifically, may be sent by using an EPDCCH in the data area B; or may be sent by using the control area A. Specifically, the scheduling information about the service data may be included in the foregoing notification message. In addition, specifically, the scheduling information may be used to instruct the user equipment to correctly demodulate control information required for data transmission over the first cell, where the control information may include, for example, a location of a time-frequency resource occupied during data transmission, a modulation and coding scheme for data transmission, and data power control information.

It should be understood that the "area" in this embodiment refers to a time-frequency resource. For example, a control area is a time-frequency resource used to send a control channel, which may specifically be a time-frequency resource used to send a physical downlink control channel (PDCCH), and the like. A data area is a time-frequency resource used to send a data channel, for example, may be a time-frequency resource used to send a physical downlink shared channel (PDSCH); optionally, the data area may further include a time-frequency resource used to send an EPDCCH. A synchronization area is a time-frequency resource used to send a synchronization channel. A common control area is a time-frequency resource used to send a common control channel. A preoccupied area is a time-frequency resource used to send a preoccupied signal.

X, Y, and Z shown in FIG. 3 may respectively represent a start location of a control area, an end location of the control area, and an end location of a data area that are of one subframe corresponding to the second cell. X1, Y1, and Z1 may respectively represent a start location of a preoccupied area and/or a common control area, an end location of the preoccupied area and/or the common control area, and an end location of a data area that are of the first cell. A time location represented by X1 may be earlier than a time location represented by X, or may be the same as a time location represented by X; a time location represented by Y1 may be later than or be the same as a time location represented by Y; a time location represented by Z1 may be the same as a time location represented by Z. For brevity, similarities in other diagrams are not described again subsequently.

In this embodiment, the foregoing S140 of determining that the first cell is in an available state may include: determining, by means of energy detection and/or by means of signal parsing, that the first cell is in an available state. Signal parsing may also be understood as signal demodulation.

Specifically, the base station may determine, by means of energy detection and/or signal parsing, whether the first cell is in an available state or an unavailable state. For example, when it is determined, by means of energy detection, that energy of the first cell is less than a preset threshold, it may be determined that the first cell is in an available state, where the energy may be represented by using received signal strength, for example, may be represented by using power and amplitude. For example, when a result obtained after parsing of a signal carried over the first cell is determined by means of signal parsing, it may be determined whether the first cell is in an available state or an unavailable state. The base station may learn, by means of predefinition or notification, a resource used by a signal used to indicate whether the first cell is in an available state or an unavailable state, and/or necessary information required for parsing the signal. The resource herein includes a time domain resource and/or a frequency domain resource and/or a code domain resource. The necessary information herein may include a modulation and coding scheme of the signal, data power control information, and the like. The base station may receive, on a determined time-frequency resource by using the foregoing information, the signal used to indicate whether the first cell is in an available state or an unavailable state, and parse the signal by using the necessary information required for parsing the signal, so as to determine a state of a frequency domain corresponding to the first cell. For another example, when it is determined, by means of energy detection, that energy of the first cell is less than a preset threshold, and when a result obtained after parsing of a signal carried over the first cell is determined by means of signal parsing, it may be determined whether the first cell is in an available state or an unavailable state.

Optionally, one principle of determining that the first cell is in an available state may be: a signal sent by another device over the first cell has no impact or relatively small impact on a signal sent by the base station over the first cell. Specifically, the foregoing preset threshold may be determined according to a specific situation, for example, may be determined according to a factor such as power for sending the common control channel over the first cell by the base station, or current data service load. Details may be determined according to an actual situation, and this embodiment of the present invention constitutes no limitation thereto.

Optionally, in this embodiment, the base station may periodically perform energy detection and/or signal parsing to determine whether the first cell is in an available state or an unavailable state. For example, the base station may periodically perform energy detection, and when determining, by means of energy detection, whether the first cell is in an available state or an unavailable state, the base station further determines, by means of signal parsing, whether the first cell is in an available state or an unavailable state. For example, the base station may periodically perform signal parsing, and when determining, by means of signal parsing, whether the first cell is in an available state or an unavailable state, the base station further determines, by means of energy detection, whether the first cell is in an available state or an unavailable state.

Optionally, when determining that the second cell cannot meet a requirement for sending service data because of heavy load or low data transmission efficiency of the second cell, and determining that the service data needs to be sent by using the first cell, the base station may determine, by means of energy detection and/or signal parsing, whether the first cell is in an available state or an unavailable state.

Alternatively, in this embodiment, the method 100 may further include: receiving a listening report message sent by first user equipment in the user equipment set when the first user equipment determines, according to energy detection and/or signal parsing, that the first cell is in an available state. In this case, the foregoing S140 of determining that the first cell is in an available state may include: determining, according to the listening report message, that the first cell is in an available state. It should be understood that the listening report message may be also referred to as a listening notification message, and the like. Regardless of the name, a listening report message falls within the protection scope of the present invention provided that the listening report message can be used to implement the function that is mentioned and that is used to notify the base station that the first cell is in an available state.

Specifically, the user equipment may determine, according to energy detection and/or signal parsing, whether the first cell is in an available state or an unavailable state. For example, when it is determined, by means of energy detection, that energy of the first cell is less than a preset threshold, it may be determined that the first cell is in an available state, where the energy may be represented by using received signal strength, for example, may be represented by using power and amplitude. For example, when a result obtained after parsing of a signal carried over the first cell is determined by means of signal parsing, it may be determined whether the first cell is in an available state or an unavailable state. The user equipment may learn, by means of predefinition or notification, a resource used by a signal used to indicate whether the first cell is in an available state or an unavailable state, and/or necessary information required for parsing the signal. The resource herein includes a time domain resource and/or a frequency domain resource and/or a code domain resource. The necessary information herein may include a modulation and coding scheme of the signal, data power control information, and the like. The user equipment may receive, on a determined time-frequency resource by using the foregoing information, the signal used to indicate whether the first cell is in an available state or an unavailable state, and parse the signal by using the necessary information required for parsing the signal, so as to determine a state of a frequency domain corresponding to the first cell. For another example, when it is determined, by means of energy detection, that energy of the first cell is less than a preset threshold, and when a result obtained after parsing of a signal carried over the first cell is determined by means of signal parsing, it may be determined whether the first cell is in an available state or an unavailable state. After determining whether the first cell is in an available state or an unavailable state, the user equipment may send the listening report message to the base station, and the base station may determine, according to the listening report message, whether the first cell is in an available state or an unavailable state. In this embodiment, the base station may determine whether the first cell is in an available state or an unavailable state immediately after receiving a listening report message sent by one user equipment; or the base station determines whether the first cell is in an available state or an unavailable state only after receiving listening report messages sent by multiple user equipments, and in this case, the above-mentioned first user equipment represents the multiple user equipments.

Optionally, the user equipment may periodically perform energy detection and/or signal parsing to determine whether the first cell is in an available state or an unavailable state. For example, the user equipment may periodically perform energy detection, and when determining, by means of energy detection, whether the first cell is in an available state or an unavailable state, the user equipment further determines, by means of signal parsing, whether the first cell is in an available state or an unavailable state. For another example, the user equipment may periodically perform signal parsing, and when determining, by means of signal parsing, whether the first cell is in an available state or an unavailable state, the user equipment further determines, by means of energy detection, whether the first cell is in an available state or an unavailable state. Optionally, after receiving carrier configuration and/or activation information sent by the base station, the user equipment may periodically perform energy detection and/or signal parsing to determine whether the first cell is in an available state or an unavailable state.

Optionally, the user equipment may determine, by means of energy detection and/or signal parsing, whether the first cell is in an available state or an unavailable state, only after receiving indication information that is sent by the base station and used to instruct the user equipment to determine whether the first cell is in an available state or an unavailable state. When determining that the second cell cannot meet a requirement for sending service data because of heavy load or low data transmission efficiency of the second cell, and determining that the service data needs to be sent by using the first cell, the base station may send, to the user equipment, the indication information used to instruct the user equipment to determine whether the first cell is in an available state or an unavailable state. Certainly, if the user equipment is aware that data transmission efficiency is low in the second cell, the user equipment may also actively detect whether the first cell is in an available state or an unavailable state. Optionally, the indication information herein that is sent by the base station and used to instruct the user equipment to determine whether the first cell is in an available state or an unavailable state may be carrier activation information. For example, the base station may enable, by using the carrier activation information, the user equipment to identify the first cell and determine whether the first cell is in an available state or an unavailable state.

In this embodiment, the foregoing common control channel sent by using the first cell may include at least one of a synchronization channel, a physical broadcast channel, a common control channel that carries a system information block, and a common control channel that carries a reference signal for performing measurement. The system information block may be a system information block corresponding to a system information block type 1, or may be a system information block of another type. The reference signal for performing measurement may be a channel state information-reference signal (CSI-RS), a common reference signal, a discovery reference signal (DRS), or the like.

In this embodiment, the foregoing common control channel sent by using the first cell may include only one or several of the foregoing common control channels. For example, when determining that the user equipment needs to be synchronized with the first cell, the base station may send only the synchronization channel; or when determining that the user equipment needs to perform measurement, the base station may send only the common control channel that carries the reference signal for performing measurement. Details may be determined with reference to an actual situation, and the present invention constitutes no limitation thereto.

Figure 7:
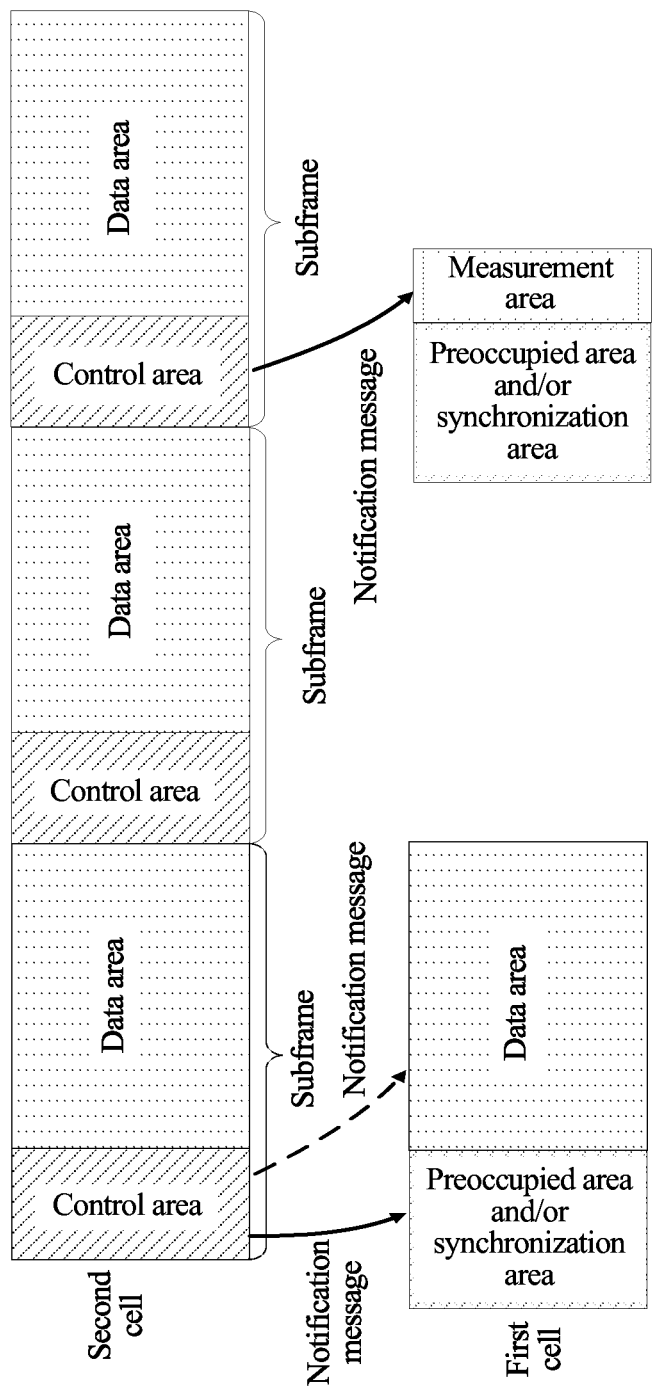
FIG. 7 is a schematic diagram of utilization of time-frequency resources according to another embodiment.
Figure 8:
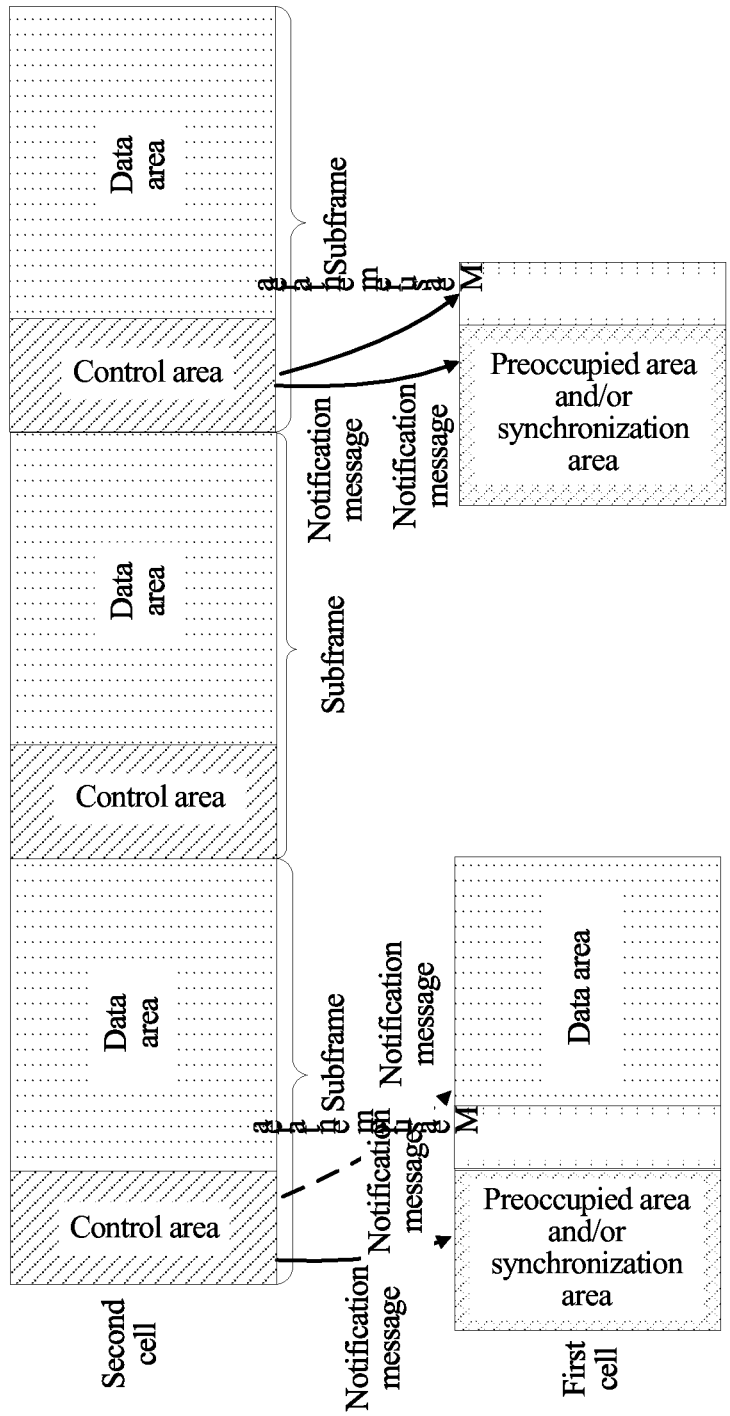
FIG. 8 is a schematic diagram of utilization of time-frequency resources according to another embodiment.

For example, as shown in FIG. 7 and FIG. 8, the base station sends a notification message to the user equipment by using a control area of a second cell, where the notification message may be used to instruct the user equipment in the user equipment set to detect a synchronization channel in a preoccupied area and/or a synchronization area of a first cell, so that the user equipment in the user equipment set acquires synchronization information of the first cell. When the base station needs to instruct the user equipment in the user equipment set to perform measurement on the second cell, the base station sends the notification message to the user equipment by using the control area of the second cell, so as to instruct the user equipment in the user equipment set to perform measurement on the second cell. Measurement content may be: performing channel state information (CSI) measurement and radio resource management (RRM) measurement by using a reference signal carried over a common control channel. Optionally, RRM measurement may specifically include reference signal received power (RSRP) measurement and reference signal received quality (RSRQ) measurement. As shown in FIG. 7, the common control channel that carries the reference signal for performing measurement is distributed in a measurement area. Optionally, in front of the measurement area, the base station may set a preoccupied area and/or a synchronization area on a spectrum corresponding to the first cell. It should be noted that FIG. 7 and FIG. 8 are merely examples. An area used to carry another common control channel may further exist between the preoccupied area and/or the synchronization area and the measurement area that are shown in the diagram. In this embodiment of the present invention, as shown in FIG. 8, before sending data to the user equipment on the spectrum corresponding to the first cell, the base station may further send, in the measurement area, the common control channel that carries the reference signal for performing measurement, where the sent data is carried in a data area. Certainly, the measurement area may also be located in the data area, which is not limited herein.

The common control channel in this embodiment of the present invention may be used to carry common control information. Optionally, the common control information may be a synchronization signal carried over a synchronization channel and/or time (and/or frequency) synchronization information provided by the synchronization signal, information carried over a physical broadcast channel, information carried over a system information block, a reference signal for performing measurement, and the like.

In this embodiment, the synchronization channel may be a channel carrying a synchronization signal, where the synchronization signal is a signal that can provide time and/or frequency synchronization information, for example, may be a primary synchronization signal (PSS)/secondary synchronization signal (SSS), a cell-specific reference signal (CRS), a channel state information-reference signal (CSI-RS), a positioning reference signal (PRS), or a discovery reference signal (DRS).

In this embodiment, when the common control channel sent by using the first cell includes a synchronization channel, and it is determined that synchronization performance of the user equipment in the user equipment set cannot meet a synchronization requirement, the method 100 may further include: generating a second notification message, where the second notification message is used to instruct the user equipment in the user equipment set to detect a synchronization channel of the first cell in the first cell; sending the second notification message to the user equipment in the user equipment set by using the second cell; and sending the synchronization channel to the user equipment in the user equipment set by using the first cell. It should be understood that the synchronization performance of the user equipment is used to measure synchronism between the user equipment and the first cell.

Figure 4:
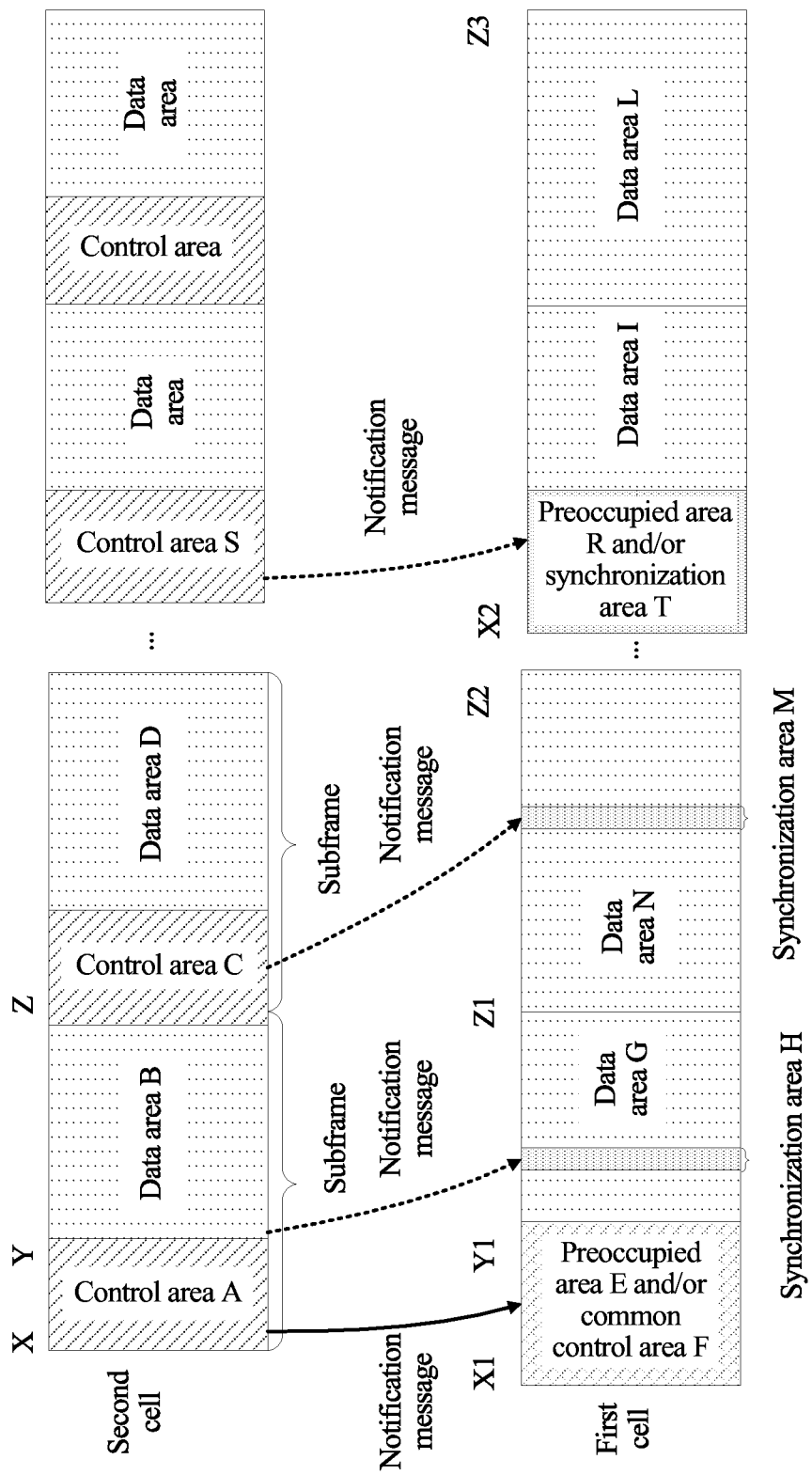
FIG. 4 is a schematic diagram of utilization of time-frequency resources according to another embodiment.

For example, as shown in FIG. 4, the base station sends a notification message to the user equipment by using a control area A of the second cell, where the notification message may be used to instruct the user equipment in the user equipment set to detect a common control channel in a common control area F. In this case, the common control channel includes at least a synchronization channel. Optionally, before sending the notification message, the base station may determine, according to performance of the user equipment, whether synchronization channels need to be sent in a synchronization area H and a synchronization area M, and if the synchronization channels need to be sent in the synchronization area H and the synchronization area M, the notification message is further used to instruct the user equipment in the user equipment set to detect synchronization channels in the synchronization area H and the synchronization area M. Therefore, the base station may send the common control channel in the common control area F and send the synchronization channels in the synchronization area H and the synchronization area M. After detecting the synchronization channel in the common control area F, the user equipment may implement initial synchronization and/or synchronization tracking according to a synchronization signal carried over the synchronization channel, so as to meet a synchronization requirement in a data transmission process; and the user equipment detects the synchronization channels in the synchronization area H and the synchronization area M to further implement synchronization tracking. Synchronization signals carried over the synchronization channels carried in the synchronization area H and the synchronization area M may be different from the synchronization signal carried over the synchronization channel carried in the common control area F. For example, the synchronization channels carried in the synchronization area H and the synchronization area M may be synchronization channels carrying CRSs, and the synchronization channel carried in the common control area F may be a synchronization channel carrying a PSS/SSS.

Optionally, in this embodiment, in an area following areas shown by X1 to Z2, if it is detected that synchronization performance of all or some user equipments in the user equipment set cannot meet the synchronization requirement, the notification message used to instruct the user equipment in the user equipment set to detect a synchronization channel may be sent again, and the synchronization channel is sent. For example, as shown in FIG. 4, the notification message may be sent in a control area S, where the notification message sent again may be used to instruct the user equipment in the user equipment set to detect a synchronization channel in a synchronization area T, and then the base station may send the synchronization channel again in the synchronization area T. Optionally, before the synchronization channel is sent in the synchronization area T, a preoccupied signal may further be sent in a preoccupied area R. Optionally, a synchronization area (not shown) similar to the synchronization areas H and M may further be inserted in a data area I and/or a data area L following the synchronization area T, and the user equipment may be notified of the possible inserted synchronization area together with the common control area F.

Optionally, if common control information carried over another common control channel, sent in the common control area, than the synchronization channel is not updated, the another common control channel than the synchronization channel is not required to be sent subsequently. For example, as shown in FIG. 4, in X2 and Z3 areas, only the synchronization area T used to send the synchronization channel exists, and an area used to send another common control channel than the synchronization channel does not exist.

In this embodiment, when common control information carried over the common control channel is updated, the method 100 may further include: generating a third notification message, where the third notification message is used to instruct the user equipment in the user equipment set to detect an updated common control channel of the first cell in the first cell, and the updated common control channel is used to carry updated common control information; sending the third notification message to the user equipment in the user equipment set by using the second cell; and sending the updated common control channel to the user equipment in the user equipment set by using the first cell.

Figure 5:
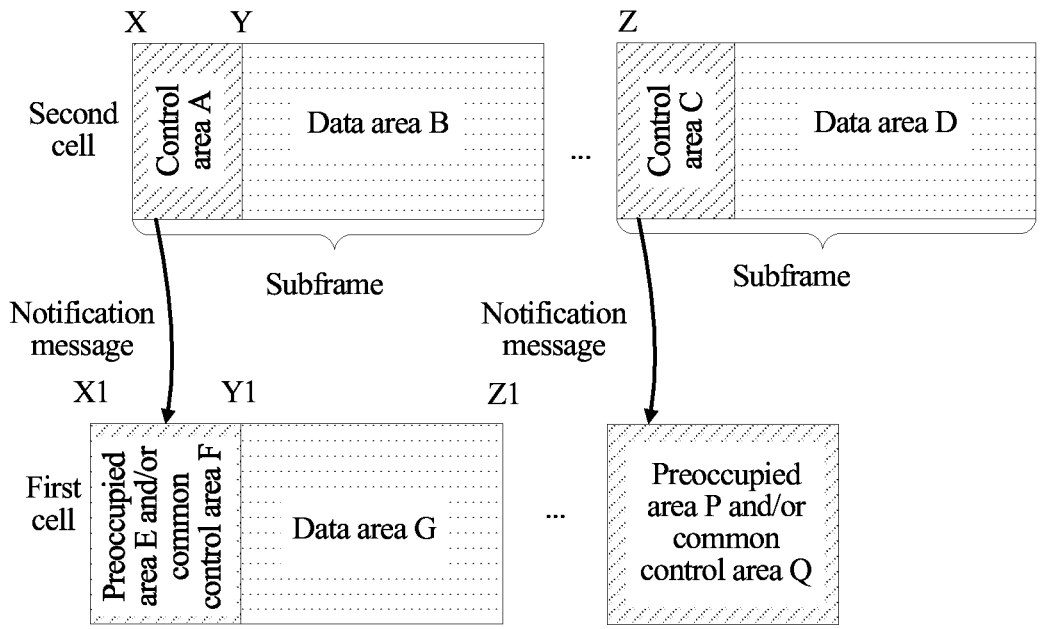
FIG. 5 is a schematic diagram of utilization of time-frequency resources according to another embodiment.

For example, as shown in FIG. 5, if determining that common control information carried over a common control channel is updated, the base station may continue detecting whether the first cell is in an available state or an unavailable state, and if the first cell is in an available state, the base station may send a notification message again by using a control area C, where the notification message is used to instruct the user equipment to detect an updated common control channel in a common control area Q; and send the updated common control channel in the common control area Q, where the updated common control channel is used to carry updated common control information. Optionally, as shown in FIG. 5, a preoccupied area P may further exist, and after it is detected that the first cell is in an available state, a preoccupied signal may be sent in the preoccupied area P. If the base station determines that a synchronization channel sent in a common control area F can meet a synchronization performance requirement, for example, can meet a requirement for demodulating the common control channel carried in the common control area Q in FIG. 5 or meet a requirement for demodulating a data channel carried in a possible data area following the common control area Q, the base station may send only another common control channel than the synchronization channel in the common control area Q.

Figure 6:
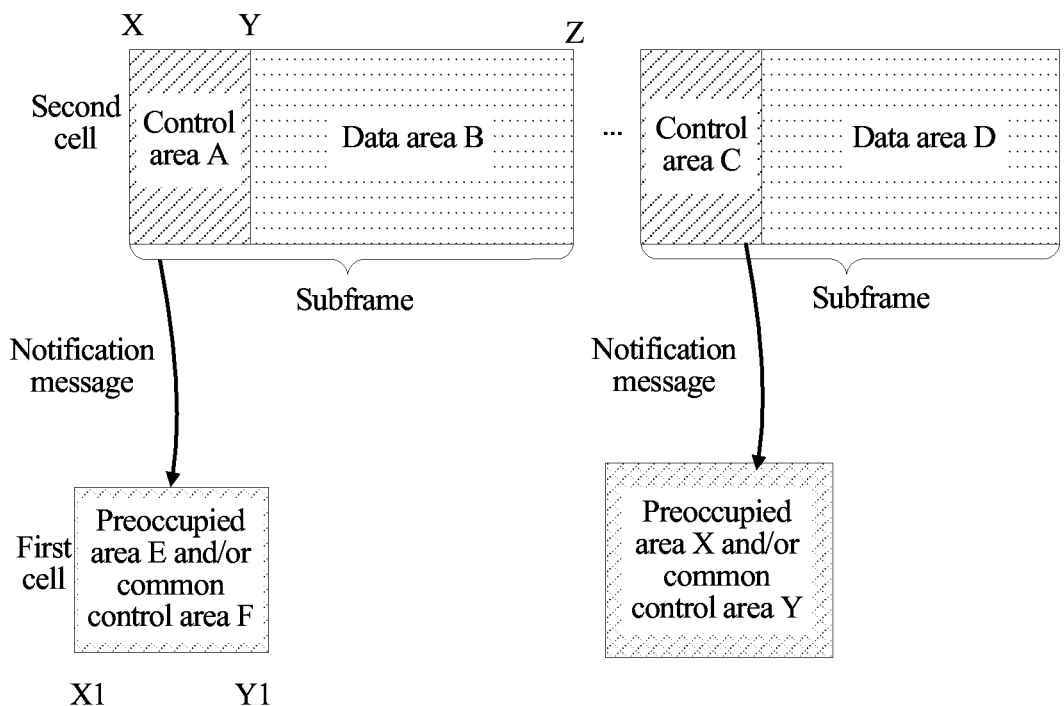
FIG. 6 is a schematic diagram of utilization of time-frequency resources according to another embodiment.

In this embodiment, only when service data needs to be sent over the first cell, for example, when the second cell cannot meet a requirement for sending the service data because of heavy load or low data transmission efficiency of the second cell, and the base station determines that the service data needs to be sent by using the first cell, the base station may detect whether the first cell is in an available state or an unavailable state. If the first cell is in an available state, a preoccupied signal and/or a common control channel and the service data are sent over the first cell. Alternatively, in this embodiment, the base station may periodically detect whether the first cell is in an available state or an unavailable state. If the first cell is in an available state, and service data needs to be sent to the user equipment by using the first cell, for example, when channel quality of the first cell is better than channel quality of the second cell, and/or load of the second cell is heavier, it may be determined that the service data needs to be sent to the user equipment by using the first cell, and then a preoccupied signal and/or a common control channel may be sent over the first cell. Alternatively, in this embodiment, after detecting (for example, periodically detecting) that the first cell is in an available state, regardless of whether service data needs to be sent by using the first cell at this moment, the base station may send a preoccupied signal and/or a common control channel over the first cell, that is, there exist a preoccupied area E and/or a common control area F, and a preoccupied area X and/or a common control area Y that are shown in FIG. 6.

In this embodiment, different common control channels may be sent in different preoccupied areas. For example, as shown in FIG. 6, if a synchronization channel is sent in the common control area F, and synchronization implemented by the user equipment by using a synchronization signal carried over the synchronization channel sent in the common control area F can meet a synchronization performance requirement, the base station may send another common control channel than the synchronization channel in the common control area Y.

In this embodiment of the present invention, the S130 of sending the common control channel to the user equipment in the user equipment set may include: periodically sending the common control channel to the user equipment in the user equipment set. Optionally, the method 100 may further include: when it is determined that the first cell is occupied by another device, generating a stop detection message, where the stop detection message is used to instruct the user equipment in the user equipment set to stop detecting the common control channel; and sending the stop detection message to the user equipment in the user equipment set by using the second cell.

Optionally, after the sending the stop detection message to the user equipment in the user equipment set by using the second cell, the method 100 may further include: determining that the first cell is in an available state; generating a fourth notification message, where the fourth notification message is used to instruct the user equipment in the user equipment set to detect the common control channel of the first cell in the first cell; sending the fourth notification message to the user equipment in the user equipment set by using the second cell; and periodically sending the common control channel to the user equipment in the user equipment set by using the first cell.

In this embodiment, the base station may periodically send the common control channel to the user equipment in the user equipment set. When it is determined, by means of listening, and specifically, by means of energy detection and/or signal parsing, that the first cell is occupied by another device (such as a WiFi device), the stop detection message may be sent to the user equipment in the user equipment set by using the second cell, where the stop detection message may be used to instruct the user equipment in the user equipment set to stop detecting the common control channel. Then, if it is re-determined that the first cell is in an available state, the notification message may be sent again to the user equipment in the user equipment set by using the second cell, where the notification message sent again is used to instruct the user equipment in the user equipment set to detect the common control channel of the first cell in the first cell; then, the common control channel may be periodically sent to the user equipment in the user equipment set by using the first cell. Optionally, different common control channels may have different sending periods. The base station may add period information into the notification message, and then the user equipment may periodically detect the common control channel in the first cell according to the period information; or the base station may send the notification message according to a period the same as that for sending the common control channel, so as to trigger the user equipment to periodically detect the common control channel in the first cell.

In this embodiment, in addition to sending the common control channel by using the first cell, the base station may send the common control channel by using the second cell. For example, some common control channels (such as a synchronization channel) are sent by using the first cell, and the other common control channels (such as another common control channel than the synchronization channel) are sent by using the second cell. For another example, another common control channel than the synchronization channel may be first sent over the first cell, and a common control channel obtained after the another common control channel is updated is sent over the second cell. For another example, for another common control channel than the synchronization channel, if the another common control channel is periodically sent, the another common control channel may be first sent over the first cell for n times, and then sent over the second cell for n times. Details may be determined according to an actual situation, and the present invention constitutes no specific limitation.

In this embodiment, the above-mentioned notification message (which includes the first notification message, the second notification message, the third notification message, or the fourth notification message) may include information required for demodulating the common control channel. For example, the information required for demodulating the common control channel may include at least one of a resource location occupied by the common control channel, a modulation and coding scheme used for the common control channel, and transmit power information of the common control channel.

Specifically, when the common control channel includes the synchronization channel, the information required for demodulating the common control channel may include a time domain location, a frequency domain location, and a code domain location that are of a synchronization signal carried over the synchronization channel, a sequence form of the synchronization signal, and the like. For another common control channel than the synchronization channel, the information required for demodulating the common control channel may include a time domain location and a frequency domain location that are occupied by the another common control channel, a sequence resource, a used modulation and coding scheme, transmit power information, and the like.

In this embodiment, a part or all of an existing format may still be used in the common control channel sent over the first cell. For example, for a frequency division duplex (FDD) multiplexing system, a synchronization channel (SCH) always occurs in a subframe 0 and a subframe 5 of each radio frame, and occupies six physical resource blocks (Physical resource block, PRB) in the center of a spectrum corresponding to the first cell; for a time division duplex (TDD) multiplexing system, an SCH always occurs in subframes 0, 1, 5, and 6 of each radio frame, and occupies six PRBs in the center of the spectrum corresponding to the first cell. A physical broadcast channel (PBCH) always occurs in a subframe 0 of each radio frame. A system information block type 1 (SIB1) always occurs in a subframe 5 of each even-numbered frame, and another SIB occurs in a specified time location by scheduling the SIB1. Content carried over a common control channel may be a part or all of content carried over an existing control channel. For example, content carried over a synchronization channel may be content carried over an existing PSS/SSS, or may be information carried over a synchronization reference signal. Content carried over another common control channel than the synchronization channel, such as content carried over a physical broadcast channel or a common control channel that carries a system information block, may also be a part or all of content carried over an existing PBCH or SIB.

In this embodiment, the information required for demodulating the common control channel and the information used to instruct the user equipment in the user equipment set to detect the common control channel of the first cell in the first cell may be carried in a same notification message, or may be carried in different notification messages. For example, the above-mentioned first notification message may include multiple notification messages, where one notification message carries the information used to instruct the user equipment in the user equipment set to detect the common control channel of the first cell in the first cell, and another notification message includes the information required for demodulating the common control channel. Alternatively, the first notification message may include only the information used to instruct the user equipment in the user equipment set to detect the common control channel of the first cell in the first cell.

In this embodiment, the above-mentioned notification message (which includes the first notification message, the second notification message, the third notification message, or the fourth notification message) may be carried by using at least one of physical layer signaling, radio resource control (RRC) broadcast signaling, RRC dedicated signaling, and Media Access Control (MAC) signaling.

In this embodiment, when the foregoing notification message (which includes the first notification message, the second notification message, the third notification message, or the fourth notification message) is carried by using the physical layer signaling, the notification message may be carried in common search space (CSS) of the second cell. In this embodiment, the notification message is carried by using the physical layer signaling, which can implement fast sending of the notification message; and the notification message is carried in the common search space of the second cell, so that a group of user equipments, such as all served user equipments or a group of user equipments that have a multi-carrier aggregation capability, can identify the notification message, without a need of separately sending the notification message to particular user equipment, thereby reducing signaling overheads. Certainly, in this embodiment of the present invention, when the foregoing notification message (which includes the first notification message, the second notification message, the third notification message, or the fourth notification message) is carried by using the physical layer signaling, the notification message may also be carried in user equipment-specific search space. That is, the base station may separately send the notification message carried by using the physical layer signaling to single user equipment, and add the notification message into each user equipment-specific search space.

In this embodiment, the foregoing notification message (which includes the first notification message, the second notification message, the third notification message, or the fourth notification message) may be referred to as cross-carrier scheduling signaling, common control signaling, or the like. Regardless of the name, a notification message falls within the protection scope of the present invention provided that the notification message can meet the function that is mentioned in the present invention and used to instruct the user equipment in the user equipment set to detect the common control channel of the first cell in the first cell.

The above-mentioned notification message may further carry carrier activation information. For example, when receiving the foregoing notification message, the user equipment may consider that a carrier is activated. The carrier herein (such as the first cell) may be identified by the user equipment by means of predefinition. The notification message that carries the carrier activation information may also be another notification message than the first notification message, the second notification message, the third notification message, and the fourth notification message, for example, a fifth notification message. The fifth notification message may be sent before the first notification message, the second notification message, the third notification message, or the fourth notification message is sent, that is, the base station first activates the first cell for the user equipment by using the fifth notification message, so that the user equipment can identify the first cell, and then instructs, by using the first notification message, the second notification message, the third notification message, or the fourth notification message, the user equipment to detect the common control channel sent over the first cell. Alternatively, the fifth notification message may be sent after the first notification message, the second notification message, the third notification message, or the fourth notification message is sent, and before the user equipment is instructed to demodulate service data, that is, the base station first instructs, by using the first notification message, the second notification message, the third notification message, or the fourth notification message, the user equipment to detect the common control channel sent over the first cell, then sends the fifth notification message to activate the first cell for the user equipment, and instructs the user equipment to detect the service data sent over the first cell, where the detection herein may be understood as demodulation, and the service data may be, for example, data carried over a PDSCH.

It should be understood that the carrier activation information is information that enables the user equipment to identify a carrier. The carrier activation information mentioned in this embodiment of the present invention is information that enables the user equipment to identify the first cell. The carrier activation information may also be referred to as carrier activation indication information. Regardless of the name, carrier activation information falls within the protection scope of the present invention provided that the carrier activation information can be used to implement the foregoing function.

The above-mentioned notification message may further carry information about an operator of the first cell, so that the user equipment can learn the information about the operator of the first cell by receiving the notification message.

In this embodiment, the foregoing user equipment set may be a set of all user equipments served by the base station; or may be a set of particular user equipments, for example, one or more user equipments that currently have relatively large service data volumes. If the user equipment in the foregoing user equipment set is particular user equipment, the foregoing notification message may be carried by using RRC dedicated signaling.

Therefore, in this embodiment, a notification message used to instruct to detect a common control channel in a first cell is sent to user equipment by using a second cell, which can notify in time the user equipment that the first cell is used, and specifically, notify the user equipment that a base station needs to send the common control channel over the first cell; the base station sends the common control channel over the first cell, so that the user equipment detects the common control channel in the first cell; and the user equipment can acquire common control information of the first cell by demodulating the common control channel, so as to provide necessary information for subsequent possible service data demodulation. Further, only when it is determined that the first cell is in an available state, the notification message used to instruct to detect the common control channel in the first cell is sent to the user equipment by using the second cell, and the common control channel is sent to the user equipment by using the first cell. Therefore, mutual interference between the base station and another device such as a WiFi device can be avoided, and the another device can also obtain more resource contention opportunities. Further, when it is determined that the first cell is in an idle state, a preoccupied signal is sent over the first cell, which can avoid that the first cell is occupied by another device. Therefore, a shared spectrum can be properly used in a form of cell configuration.

Figure 9:
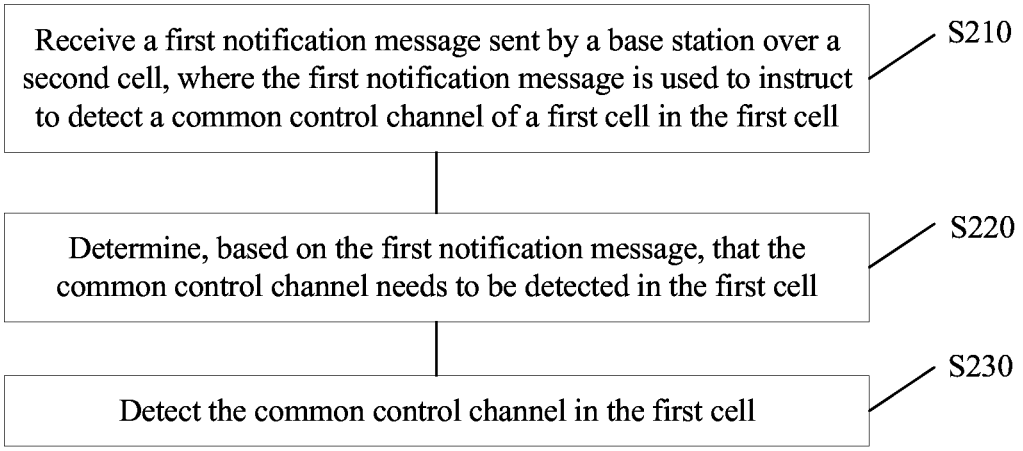
FIG. 9 is a schematic flowchart of an information transmission method according to another embodiment.

FIG. 9 is a schematic flowchart of an information transmission method 200 according to an embodiment. The method 200 may be executed by user equipment. As shown in FIG. 9, the method 200 may include the following steps.

S210. Receive a first notification message sent by a base station over a second cell, where the first notification message is used to instruct to detect a common control channel of a first cell in the first cell.

S220. Determine, based on the first notification message, that the common control channel needs to be detected in the first cell.

S230. Detect the common control channel in the first cell based on the first notification message.

When determining that the common control channel of the first cell needs to be sent, the base station may send a notification message to user equipment in a user equipment set by using the second cell, so as to instruct the user equipment in the user equipment set to detect the common control channel of the first cell in the first cell. In addition, the base station may send the common control channel to the user equipment in the user equipment set by using the first cell, so that the user equipment in the user equipment set can detect the common control channel of the first cell in the first cell according to the notification message.

Therefore, in this embodiment, a notification message used to instruct to detect a common control channel in a first cell is sent to user equipment by using a second cell, which can notify in time the user equipment that the first cell is used, and specifically, notify the user equipment that a base station needs to send the common control channel over the first cell; the base station sends the common control channel over the first cell, so that the user equipment detects the common control channel in the first cell; and the user equipment can acquire common control information of the first cell by demodulating the common control channel, so as to provide necessary information for subsequent possible service data demodulation. Therefore, a shared spectrum can be properly used in a form of cell configuration.

Optionally, in this embodiment, the foregoing S210 of receiving a first notification message sent by a base station over a second cell may include: receiving the first notification message sent by the base station over the second cell when the base station determines that the first cell is in an available state.

Therefore, in this embodiment, only when determining that the first cell is in an available state, the base station sends, to the user equipment by using the second cell, the notification message used to instruct to detect the common control channel in the first cell, and sends the common control channel to the user equipment by using the first cell. Therefore, mutual interference between the base station and another device such as a WiFi device can be avoided, and the another device can also obtain more resource contention opportunities.

In this embodiment, before the receiving notification information sent by the base station over the second cell when the base station determines that the first cell is in an available state, the method may further include: determining, according to energy detection and/or signal parsing, that the first cell is in an available state; and generating and sending a listening report message to the base station, where the listening report message is used to indicate that the first cell is in an available state.

Specifically, the user equipment may determine, according to energy detection and/or signal parsing, whether the first cell is in an available state or an unavailable state. For example, when it is determined, by means of energy detection, that energy of the first cell is less than a preset threshold, it may be determined that the first cell is in an available state, where the energy may be represented by using received signal strength, for example, may be represented by using power and amplitude. For example, when a result obtained after parsing of a signal carried over the first cell is determined by means of signal parsing, it may be determined whether the first cell is in an available state or an unavailable state. The user equipment may learn, by means of predefinition or notification, a resource used by a signal used to indicate whether the first cell is in an available state or an unavailable state, and/or necessary information required for parsing the signal. The resource herein includes a time domain resource and/or a frequency domain resource and/or a code domain resource. The necessary information herein may include a modulation and coding scheme of the signal, data power control information, and the like. The user equipment may receive, on a determined time-frequency resource by using the foregoing information, the signal used to indicate whether the first cell is in an available state or an unavailable state, and parse the signal by using the necessary information required for parsing the signal, so as to determine a state of the first cell. After determining whether the first cell is in an available state or an unavailable state, the user equipment may send the listening report message to the base station, and the base station may determine, according to the listening report message, whether the first cell is in an available state or an unavailable state. In this embodiment of the present invention, the base station may determine whether the first cell is in an available state or an unavailable state immediately after receiving a listening report message sent by one user equipment; or the base station determines whether the first cell is in an available state or an unavailable state only after receiving listening report messages sent by multiple user equipments, and in this case, the above-mentioned user equipment represents the multiple user equipments.

Optionally, the user equipment may periodically perform energy detection and/or signal parsing to determine whether the first cell is in an available state or an unavailable state. For example, the user equipment may periodically perform energy detection, and when determining, by means of energy detection, whether the first cell is in an available state or an unavailable state, the user equipment further determines, by means of signal parsing, whether the first cell is in an available state or an unavailable state. For another example, the user equipment may periodically perform signal parsing, and when determining, by means of signal parsing, whether the first cell is in an available state or an unavailable state, the user equipment further determines, by means of energy detection, whether the first cell is in an available state or an unavailable state. Optionally, after receiving carrier configuration and/or carrier activation information sent by the base station, the user equipment may periodically perform energy detection and/or signal parsing to determine whether the first cell is in an available state or an unavailable state.

Optionally, the user equipment may determine, by means of energy detection and/or signal parsing, whether the first cell is in an available state or an unavailable state, only after receiving indication information that is sent by the base station and used to instruct the user equipment to determine whether the first cell is in an available state or an unavailable state. When determining that the second cell cannot meet a requirement for sending service data because of heavy load or low data transmission efficiency of the second cell, and determining that the service data needs to be sent by using the first cell, the base station may send, to the user equipment, the indication information used to instruct the user equipment to determine whether the first cell is in an available state or an unavailable state. Certainly, if the user equipment is aware that data transmission efficiency is low in the second cell, the user equipment may also actively detect whether the first cell is in an available state or an unavailable state. Optionally, the indication information herein that is sent by the base station and used to instruct the user equipment to determine whether the first cell is in an available state or an unavailable state may be carrier activation information. For example, the base station may enable, by using the carrier activation information, the user equipment to identify the first cell and determine whether the first cell is in an available state or an unavailable state.

In this embodiment, the method 200 may further include: receiving, over the first cell, service data sent by the base station.

Specifically, in this embodiment, when the second cell cannot meet a requirement for sending the service data because of heavy load or low data transmission efficiency of the second cell, the base station may determine that the service data needs to be sent by using the first cell; or when channel quality of the first cell is better than channel quality of the second cell and/or load of the second cell is heavier, the base station may determine that the service data needs to be sent to the user equipment by using the first cell.

Optionally, in this embodiment, the method 200 may further include: receiving a second notification message sent by the base station over the second cell, where the second notification message is sent by the base station when the base station determines that synchronization performance of user equipment (the user equipment herein may be the user equipment used as an execution body of the method 200, or may be another user equipment) cannot meet a synchronization requirement, and is used to instruct to detect a synchronization channel of the first cell in the first cell; determining, based on the second notification message, that the synchronization channel of the first cell needs to be detected in the first cell; and detecting the synchronization channel of the first cell in the first cell.

Optionally, in this embodiment, the method 200 may further include: receiving a third notification message sent by the base station over the second cell, where the third notification message is sent by the base station when the base station determines that common control information carried over the common control channel is updated, and the third notification message is used to instruct to detect an updated common control channel of the first cell in the first cell, and the updated common control channel is used to carry updated common control information; determining, based on the third notification message, that the updated common control channel needs to be detected in the first cell; and detecting the updated common control channel in the first cell.

Optionally, in this embodiment, the foregoing S230 of detecting the common control channel in the first cell may include: periodically detecting the common control channel in the first cell.

Optionally, the method 200 may further include: receiving a stop detection message sent by the base station over the second cell, where the stop detection message is sent by the base station when the base station determines that the first cell is occupied by another device, and is used to instruct to stop detecting the common control channel; and stopping, based on the stop detection message, detecting the common control channel in the first cell.

Optionally, in this embodiment, after the stopping detecting the common control channel in the first cell, the method 200 may further include: receiving a fourth notification message sent by the base station when the base station determines that the first cell is in an available state, where the fourth notification message is used to instruct to detect the common control channel of the first cell in the first cell; determining, based on the fourth notification message, that the common control channel needs to be periodically detected in the first cell; and periodically detecting the common control channel in the first cell.

Specifically, different common control channels may have different sending periods. The base station may add period information into the notification message, and then the user equipment may periodically detect the common control channel in the first cell according to the period information; or the base station may send the notification message according to a period the same as that for sending the common control channel, so as to trigger the user equipment to periodically detect the common control channel in the first cell.

In this embodiment, the foregoing common control channel may include at least one of the synchronization channel, a physical broadcast channel, a common control channel that carries a system information block, and a common control channel that carries a reference signal for performing measurement. The system information block may be a system information block corresponding to a system information block type 1, or may be a system information block of another type. The reference signal for performing measurement may be a CSI-RS, a CRS, a DRS, or the like.

In this embodiment, when the common control channel detected in the first cell includes the common control channel that carries the reference signal for performing measurement, the method 200 may further include: performing CSI measurement and/or radio resource management (Radio Resource Management, RRM) measurement according to the reference signal for performing measurement.

Optionally, the RRM measurement may specifically include RSRP measurement and RSRQ measurement.

The common control channel in this embodiment may be used to carry common control information. Optionally, the common control information may be a synchronization signal carried over a synchronization channel and/or time (and/or frequency) synchronization information provided by the synchronization signal, information carried over a physical broadcast channel, information carried over a system information block, a reference signal for performing measurement, and the like.

In this embodiment, the synchronization channel may be a channel carrying a synchronization signal, where the synchronization signal is a signal that can provide time and/or frequency synchronization information, for example, may be a/an PSS/SSS, a CRS, a CSI-RS, a PRS, or a DRS.

In this embodiment, the foregoing notification message may carry information required for demodulating the common control channel. Correspondingly, the S230 of detecting the common control channel in the first cell may include: detecting the common control channel in the first cell based on the information required for demodulating the common control channel.

In this embodiment, the above-mentioned notification message (which includes the first notification message, the second notification message, the third notification message, or the fourth notification message) may include information required for demodulating the common control channel. For example, the information required for demodulating the common control channel may include at least one of a resource location occupied by the common control channel, a modulation and coding scheme used for the common control channel, and transmit power information of the common control channel.

Specifically, when the common control channel includes the synchronization channel, the information required for demodulating the common control channel may include a time domain location, a frequency domain location, and a code domain location that are of a synchronization signal carried over the synchronization channel, a sequence form of the synchronization signal, and the like. For another common control channel than the synchronization channel, the information required for demodulating the common control channel may include a time domain location and a frequency domain location that are occupied by the another common control channel, a sequence resource, a used modulation and coding scheme, transmit power information, and the like.

In this embodiment, the information required for demodulating the common control channel and the information used to instruct the user equipment in the user equipment set to detect the common control channel of the first cell in the first cell may be carried in a same notification message, or may be carried in different notification messages. For example, one notification message carries the information used to instruct the user equipment in the user equipment set to detect the common control channel of the first cell in the first cell, and the other notification message includes the information required for demodulating the common control channel. Alternatively, the first notification message may include only the information used to instruct the user equipment in the user equipment set to detect the common control channel of the first cell in the first cell.

In this embodiment, the above-mentioned notification message (which includes the first notification message, the second notification message, the third notification message, or the fourth notification message) may be carried by using at least one of physical layer signaling, RRC broadcast signaling, RRC dedicated signaling, and MAC signaling.

In this embodiment, when the foregoing notification message (which includes the first notification message, the second notification message, the third notification message, or the fourth notification message) is carried by using the physical layer signaling, the notification message may be carried in common search space of the second cell. In this embodiment of the present invention, the notification message is carried by using the physical layer signaling, which can implement fast sending of the notification message; and the notification message is carried in the common search space of the second cell, so that a group of user equipments, such as all served user equipments or a group of user equipments that have a multi-carrier aggregation capability, can identify the notification message, without a need of separately sending the notification message to particular user equipment, thereby reducing signaling overheads. Certainly, in this embodiment of the present invention, when the foregoing notification message (which includes the first notification message, the second notification message, the third notification message, or the fourth notification message) is carried by using the physical layer signaling, the notification message may also be carried in user equipment-specific search space. That is, the base station may separately send the notification message carried by using the physical layer signaling to single user equipment, and add the notification message into each user equipment-specific search space.

In this embodiment, the foregoing notification message (which includes the first notification message, the second notification message, the third notification message, or the fourth notification message) may be referred to as cross-carrier scheduling signaling, common control signaling, or the like. Regardless of the name, a notification message falls within the protection scope of the present invention provided that the notification message can meet the function that is mentioned and used to instruct the user equipment in the user equipment set to detect the common control channel of the first cell in the first cell.

The above-mentioned notification message may further carry carrier activation information. For example, when receiving the foregoing notification message, the user equipment may consider that a carrier is activated. The carrier herein (such as the first cell) may be identified by the user equipment by means of predefinition. The notification message that carries the carrier activation information may also be another notification message than the first notification message, the second notification message, the third notification message, and the fourth notification message, for example, a fifth notification message. The fifth notification message may be sent before the first notification message, the second notification message, the third notification message, or the fourth notification message is sent, that is, the base station first activates the first cell for the user equipment by using the fifth notification message, so that the user equipment can identify the first cell, and then instructs, by using the first notification message, the second notification message, the third notification message, or the fourth notification message, the user equipment to detect the common control channel sent over the first cell. Alternatively, the fifth notification message may be sent after the first notification message, the second notification message, the third notification message, or the fourth notification message is sent, and before the user equipment is instructed to demodulate service data, that is, the base station first instructs, by using the first notification message, the second notification message, the third notification message, or the fourth notification message, the user equipment to detect the common control channel sent over the first cell, then sends the fifth notification message to activate the first cell for the user equipment, and instructs the user equipment to detect the service data sent over the first cell, where the detection herein may be understood as demodulation, and the service data may be, for example, data carried over a PDSCH.

In this embodiment, the foregoing user equipment set may be a set of all user equipments served by the base station; or may be a set of particular user equipments, for example, one or more user equipments that currently have relatively large service data volumes. If the user equipment in the foregoing user equipment set is particular user equipment, the foregoing notification message may be carried by using RRC dedicated signaling.

In this embodiment, the foregoing S210 of receiving a first notification message sent by a base station over a second cell may include: receiving the first notification message sent by the base station on a spectrum corresponding to the second cell, where the spectrum corresponding to the second cell is a licensed spectrum; and/or the foregoing S220 of determining that the common control channel needs to be detected in the first cell may include: determining that the common control channel needs to be detected on a spectrum corresponding to the first cell, and the foregoing S230 of detecting the common control channel in the first cell includes: detecting the common control channel on the spectrum corresponding to the first cell, where the spectrum corresponding to the first cell is an unlicensed spectrum.

It should be understood that the user equipment and the base station that are mentioned in the method 200 may be respectively corresponding to the user equipment and the base station that are mentioned in the method 100, and may respectively implement corresponding functions of the user equipment and the base station in the method 100. For brevity, details are not described herein again.

Therefore, in this embodiment, a base station sends, to user equipment by using a second cell, a notification message used to instruct to detect a common control channel in a first cell, which can notify in time the user equipment that the first cell is used, and specifically, notify the user equipment that the base station needs to send the common control channel over the first cell; the base station sends the common control channel over the first cell, so that the user equipment detects the common control channel in the first cell; and the user equipment can acquire common control information of the first cell by demodulating the common control channel, so as to provide necessary information for subsequent possible service data demodulation. Further, only when determining that the first cell is in an available state, the base station sends, to the user equipment by using the second cell, the notification message used to instruct to detect the common control channel in the first cell, and sends the common control channel to the user equipment by using the first cell. Therefore, mutual interference between the base station and another device such as a WiFi device can be avoided, and the another device can also obtain more resource contention opportunities. Therefore, a shared spectrum can be properly used in a form of cell configuration.

The information transmission methods according to the embodiments are described in the above with reference to FIG. 1 to FIG. 9. The apparatuses used to implement the foregoing methods, which are specifically a base station and user equipment, are described in the following with reference to FIG. 10 to FIG. 17.

Figure 10:
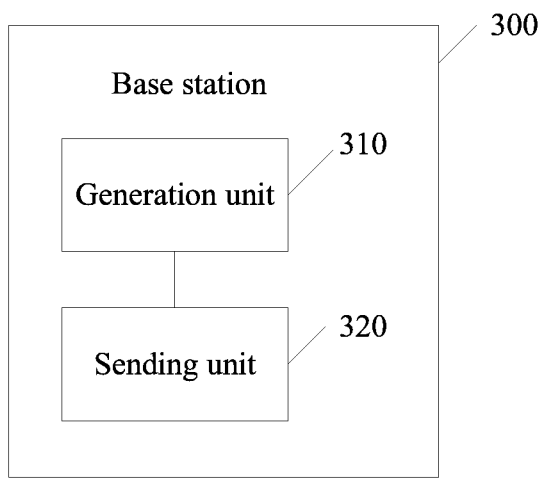
FIG. 10 is a schematic block diagram of a base station according to another embodiment.

FIG. 10 is a schematic block diagram of a base station 300 according to an embodiment. As shown in FIG. 10, the base station 300 includes a generation unit 310 and a sending unit 320.

The generation unit 310 is configured to generate a first notification message, where the first notification message is used to instruct user equipment in a user equipment set to detect a common control channel of a first cell in the first cell.

The sending unit 320 is configured to send, by using a second cell, the first notification message generated by the generation unit to the user equipment in the user equipment set.

The sending unit 320 is further configured to send the common control channel to the user equipment in the user equipment set by using the first cell.

Therefore, in this embodiment, a base station sends, to user equipment by using a second cell, a notification message used to instruct to detect a common control channel in a first cell, which can notify in time the user equipment that the first cell is used, and specifically, notify the user equipment that the base station needs to send the common control channel over the first cell; the base station sends the common control channel over the first cell, so that the user equipment detects the common control channel in the first cell; and the user equipment can acquire common control information of the first cell by demodulating the common control channel, so as to provide necessary information for subsequent possible service data demodulation. Therefore, a shared spectrum can be properly used in a form of cell configuration.

Figure 11:
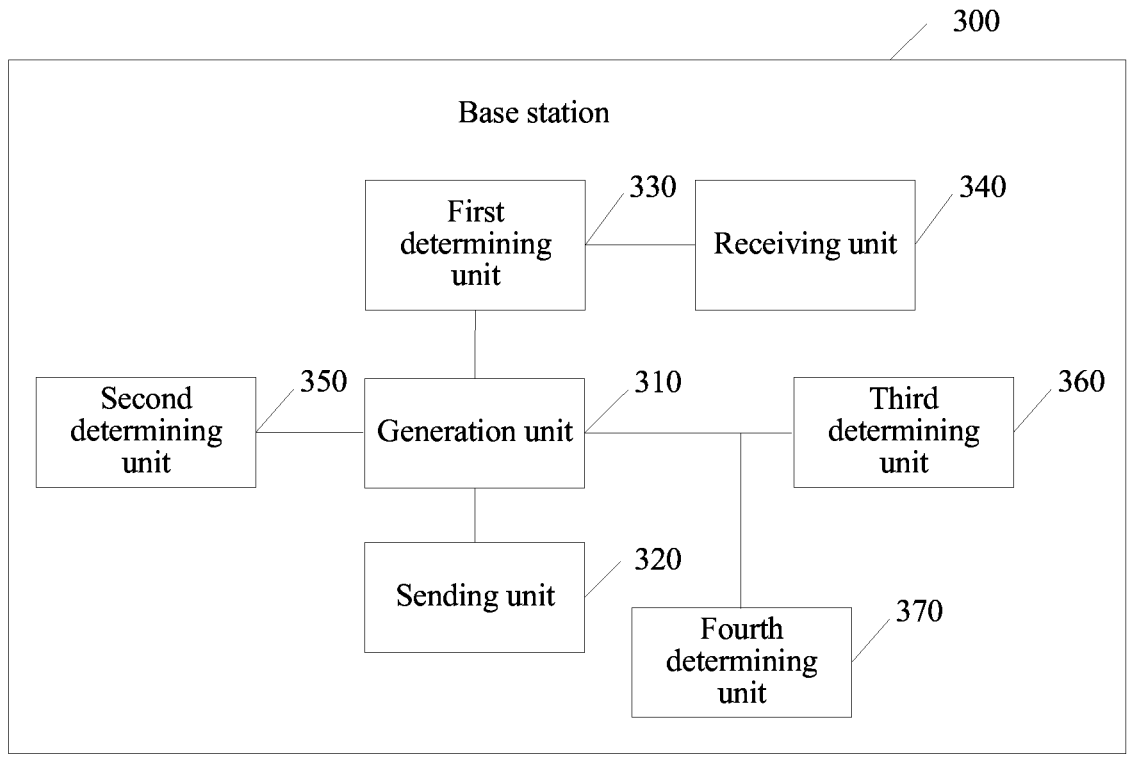
FIG. 11 is a schematic block diagram of a base station according to another embodiment.

Optionally, as shown in FIG. 11, the base station 300 further includes a first determining unit 330, where the first determining unit 330 is configured to: before the sending unit 320 sends the first notification message to the user equipment in the user equipment set by using the second cell, determine that the first cell is in an available state.

Optionally, the sending unit 320 is further configured to: after the first determining unit 330 determines that the first cell is in an available state, send a preoccupied signal over the first cell. Specifically, after the first determining unit 330 determines that the first cell is in an available state, the generation unit 310 may generate the preoccupied signal, and then the sending unit 320 may send the preoccupied signal generated by the generation unit 310.

Optionally, as shown in FIG. 11, the base station 300 further includes a receiving unit 340, and the first determining unit 330 is specifically configured to determine, by performing energy detection and/or signal parsing on a signal received by the receiving unit 340, that the first cell is in an available state.

Optionally, as shown in FIG. 11, the base station further includes: a receiving unit 340, configured to receive a listening report message sent by first user equipment in the user equipment set when the first user equipment determines, according to energy detection and/or signal parsing, that the first cell is in an available state; and the first determining unit 330 is specifically configured to determine, according to the listening report message received by the receiving unit 340, that the first cell is in an available state.

Optionally, as shown in FIG. 11, the base station 300 further includes a second determining unit 350, where the second determining unit 350 is specifically configured to: before the sending unit 320 sends the first notification message to the user equipment in the user equipment set by using the second cell, determine that the sending unit 320 needs to send service data to the user equipment in the user equipment set by using the first cell; and the sending unit 320 is further configured to: after sending the common control channel to the user equipment in the user equipment set, send the service data to the user equipment in the user equipment set by using the first cell. Specifically, after the second determining unit 350 determines that the sending unit 320 sends the service data to the user equipment in the user equipment set by using the first cell, the generation unit 310 may generate the service data, and then the sending unit 320 may send the service data generated by the generation unit 310.

Optionally, the base station 300 further includes a third determining unit 360, where the third determining unit 360 is configured to: when the common control channel includes a synchronization channel, determine whether synchronization performance of the user equipment in the user equipment set can meet a synchronization requirement; the generation unit 310 is further configured to: when the third determining unit 360 determines that the synchronization performance of the user equipment in the user equipment set cannot meet the synchronization requirement, generate a second notification message, where the second notification message is used to instruct the user equipment in the user equipment set to detect the synchronization channel of the first cell in the first cell; and the sending unit 320 is further configured to send, by using the second cell, the second notification message generated by the generation unit 310 to the user equipment in the user equipment set, and send the synchronization channel to the user equipment in the user equipment set by using the first cell.

Optionally, the base station 300 further includes a fourth determining unit 370, where the fourth determining unit 370 is configured to determine that common control information carried over the common control channel is updated; the generation unit 310 is further configured to: after the fourth determining unit 370 determines that the common control information carried over the common control channel is updated, generate a third notification message, where the third notification message is used to instruct the user equipment in the user equipment set to detect an updated common control channel of the first cell in the first cell, and the updated common control channel is used to carry updated common control information; and the sending unit 320 is further configured to send the third notification message generated by the generation unit 310 to the user equipment in the user equipment set by using the second cell, and send the updated common control channel to the user equipment in the user equipment set by using the first cell.

Optionally, the sending unit 320 is specifically configured to periodically send the common control channel to the user equipment in the user equipment set.

The generation unit 310 is further configured to: when the first determining unit 330 determines that the first cell is occupied by another device, generate a stop detection message, where the stop detection message is used to instruct the user equipment in the user equipment set to stop detecting the common control channel; and the sending unit 320 is further configured to send the stop detection message to the user equipment in the user equipment set by using the second cell. Optionally, the first determining unit 330 may determine, by performing energy detection and/or signal parsing on the signal received by the receiving unit 340, whether the first cell is occupied by another device. For specific implementation, reference may be made to descriptions in the method 100.

Optionally, the generation unit 310 is further configured to: after the sending unit 320 sends the stop detection message and the first determining unit 330 determines that the first cell is in an available state, generate a fourth notification message, where the four notification message is used to instruct the user equipment in the user equipment set to detect the common control channel of the first cell in the first cell; and the sending unit 320 is further configured to send the fourth notification message generated by the generation unit 310, and periodically send the common control channel to the user equipment in the user equipment set by using the first cell.

Optionally, the sending unit 320 is specifically configured to send, by using a spectrum corresponding to the second cell, the first notification message generated by the generation unit 310 to the user equipment in the user equipment set, where the spectrum corresponding to the second cell is a licensed spectrum; and/or the sending unit 320 is specifically configured to send the common control channel to the user equipment in the user equipment set by using a spectrum corresponding to the first cell, where the spectrum corresponding to the first cell is an unlicensed spectrum.

Optionally, the second cell mentioned in this embodiment may be a primary cell (PCell) corresponding to the base station and/or the user equipment, and the first cell may be a secondary cell (SCell) corresponding to the base station and/or the user equipment. In this embodiment of the present invention, sending a message (which may be specifically the first notification message, the second notification message, the third notification message, or the fourth notification message mentioned in the following) by using the second cell is sending a channel by using a spectrum corresponding to the second cell. Sending a channel (which may be specifically the common control channel or a channel used to carry service data) by using the first cell is sending a message by using a spectrum corresponding to the first cell. The spectrum corresponding to the first cell may be an unlicensed spectrum, and/or the spectrum corresponding to the second cell may be a licensed spectrum. The spectrum corresponding to the first cell may be a shared spectrum jointly used by a device in an LTE system and another device, where the another device may be a WiFi device.

Optionally, the second cell and the first cell may belong to a same base station. For example, both the second cell and the first cell may belong to a same macro base station. The second cell and the first cell may also belong to different base stations. For example, the second cell belongs to a macro base station, and the first cell belongs to a base station (which is a base station with low transmit power) corresponding to a small cell. The small cell herein may include: a metro cell, a micro cell, a pico cell, a femto cell, a wireless local area network (WLAN) that uses a wireless fidelity (WiFi) technology, and the like. These small cells feature a small coverage area and low transmit power, and are capable of providing a high-speed data transmission service.

In this embodiment, the foregoing common control channel may include at least one of the synchronization channel, a physical broadcast channel, a common control channel that carries a system information block, and a common control channel that carries a reference signal for performing measurement. The system information block may be a system information block corresponding to a system information block type 1, or may be a system information block of another type. The reference signal for performing measurement may be a CSI-RS, a CRS, or a DRS.

In this embodiment, the above-mentioned notification message (which includes the first notification message, the second notification message, the third notification message, or the fourth notification message) may include information required for demodulating the common control channel. For example, the information required for demodulating the common control channel may include at least one of a resource location occupied by the common control channel, a modulation and coding scheme used for the common control channel, and transmit power information of the common control channel.

Specifically, when the common control channel includes the synchronization channel, the information required for demodulating the common control channel may include a time domain location, a frequency domain location, and a code domain location that are of a synchronization signal carried over the synchronization channel, a sequence form of the synchronization signal, and the like. For another common control channel than the synchronization channel, the information required for demodulating the common control channel may include a time domain location and a frequency domain location that are occupied by the another common control channel, a sequence resource, a used modulation and coding scheme, transmit power information, and the like.

In this embodiment, the information required for demodulating the common control channel and the information used to instruct the user equipment in the user equipment set to detect the common control channel of the first cell in the first cell may be carried in a same notification message, or may be carried in different notification messages. For example, the above-mentioned first notification message may include multiple notification messages, where one notification message carries the information used to instruct the user equipment in the user equipment set to detect the common control channel of the first cell in the first cell, and another notification message includes the information required for demodulating the common control channel. Alternatively, the first notification message may include only the information used to instruct the user equipment in the user equipment set to detect the common control channel of the first cell in the first cell.

In this embodiment, the above-mentioned notification message (which includes the first notification message, the second notification message, the third notification message, or the fourth notification message) may be carried by using at least one of physical layer signaling, radio resource control (RRC) broadcast signaling, RRC dedicated signaling, and Media Access Control (MAC) signaling.

In this embodiment, when the foregoing notification message (which includes the first notification message, the second notification message, the third notification message, or the fourth notification message) is carried by using the physical layer signaling, the notification message may be carried in common search space of the second cell. In this embodiment of the present invention, the notification message is carried by using the physical layer signaling, which can implement fast sending of the notification message; and the notification message is carried in the common search space of the second cell, so that a group of user equipments, such as all served user equipments or a group of user equipments that have a multi-carrier aggregation capability, can identify the notification message, without a need of separately sending the notification message to particular user equipment, thereby reducing signaling overheads. Certainly, in this embodiment, when the foregoing notification message (which includes the first notification message, the second notification message, the third notification message, or the fourth notification message) is carried by using the physical layer signaling, the notification message may also be carried in user equipment-specific search space. That is, the base station may separately send the notification message carried by using the physical layer signaling to single user equipment, and add the notification message into each user equipment-specific search space.

In this embodiment, the foregoing notification message (which includes the first notification message, the second notification message, the third notification message, or the fourth notification message) may be referred to as cross-carrier scheduling signaling, common control signaling, or the like. Regardless of the name, a notification message falls within the protection scope of the present invention provided that the notification message can meet the function that is mentioned in the present invention and used to instruct the user equipment in the user equipment set to detect the common control channel of the first cell in the first cell.

The above-mentioned notification message may further carry carrier activation information. For example, when receiving the foregoing notification message, the user equipment may consider that a carrier is activated. The carrier herein (such as the first cell) may be identified by the user equipment by means of predefinition. The notification message that carries the carrier activation information may also be another notification message than the first notification message, the second notification message, the third notification message, and the fourth notification message, for example, a fifth notification message. The fifth notification message may be sent before the first notification message, the second notification message, the third notification message, or the fourth notification message is sent, that is, the base station first activates the first cell for the user equipment by using the fifth notification message, so that the user equipment can identify the first cell, and then instructs, by using the first notification message, the second notification message, the third notification message, or the fourth notification message, the user equipment to detect the common control channel sent over the first cell. Alternatively, the fifth notification message may be sent after the first notification message, the second notification message, the third notification message, or the fourth notification message is sent, and before the user equipment is instructed to demodulate service data, that is, the base station first instructs, by using the first notification message, the second notification message, the third notification message, or the fourth notification message, the user equipment to detect the common control channel sent over the first cell, then sends the fifth notification message to activate the first cell for the user equipment, and instructs the user equipment to detect the service data sent over the first cell, where the detection herein may be understood as demodulation, and the service data may be, for example, data carried over a PDSCH.

It should be understood that the carrier activation information is information that enables the user equipment to identify a carrier. The carrier activation information mentioned in this embodiment of the present invention is information that enables the user equipment to identify the first cell. The carrier activation information may also be referred to as carrier activation indication information. Regardless of the name, carrier activation information falls within the protection scope of the present invention provided that the carrier activation information can be used to implement the foregoing function.

The above-mentioned notification message may further carry information about an operator of the first cell, so that the user equipment can learn the information about the operator of the first cell by receiving the notification message.

In this embodiment, the foregoing user equipment set may be a set of all user equipments served by the base station; or may be a set of particular user equipments, for example, one or more user equipments that currently have relatively large service data volumes. If the user equipment in the foregoing user equipment set is particular user equipment, the foregoing notification message may be carried by using RRC dedicated signaling.

It should be understood that the base station 300 may be corresponding to the base station in the method 100 or 200, and may implement corresponding functions implemented by the base station in the method 100 or 200. For brevity, details are not described herein again.

Therefore, in this embodiment, a base station sends, to user equipment by using a second cell, a notification message used to instruct to detect a common control channel in a first cell, which can notify in time the user equipment that the first cell is used, and specifically, notify the user equipment that the base station needs to send the common control channel over the first cell; the base station sends the common control channel over the first cell, so that the user equipment detects the common control channel in the first cell; and the user equipment can acquire common control information of the first cell by demodulating the common control channel, so as to provide necessary information for subsequent possible service data demodulation. Further, only when determining that the first cell is in an available state, the base station sends, to the user equipment by using the second cell, the notification message used to instruct to detect the common control channel in the first cell, and sends the common control channel to the user equipment by using the first cell. Therefore, mutual interference between the base station and another device such as a WiFi device can be avoided, and the another device can also obtain more resource contention opportunities. Further, when determining that the first cell is in an idle state, the base station sends a preoccupied signal over the first cell, which can avoid that the first cell is occupied by another device. Therefore, a shared spectrum can be properly used in a form of cell configuration.

Figure 12:
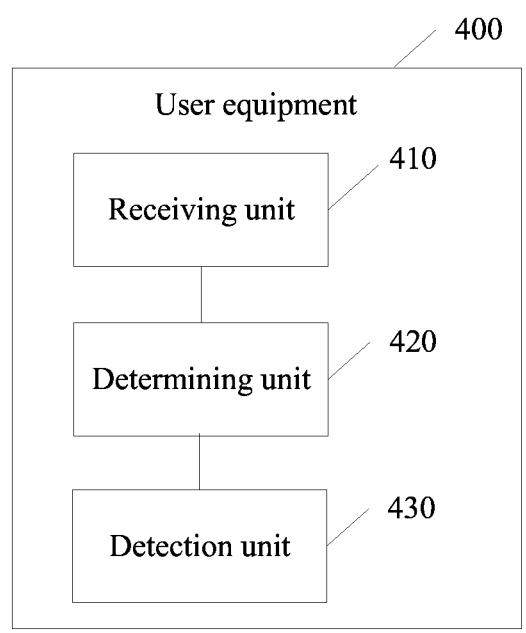
FIG. 12 is a schematic block diagram of user equipment according to another embodiment.

FIG. 12 is a schematic block diagram of user equipment 400 according to an embodiment. As shown in FIG. 12, the user equipment 400 includes a receiving unit 410, a determining unit 420, and a detection unit 430.

The receiving unit 410 is configured to receive a first notification message sent by a base station over a second cell, where the first notification message is used to instruct to detect a common control channel of a first cell in the first cell.

The determining unit 420 is configured to determine, based on the first notification message received by the receiving unit 410, that the detection unit 430 needs to detect the common control channel in the first cell.

The detection unit 430 is configured to detect the common control channel in the first cell.

Therefore, in this embodiment, a base station sends, to user equipment by using a second cell, a notification message used to instruct to detect a common control channel in a first cell, which can notify in time the user equipment that the first cell is used, and specifically, notify the user equipment that the base station needs to send the common control channel over the first cell; the base station sends the common control channel over the first cell, so that the user equipment detects the common control channel in the first cell; and the user equipment can acquire common control information of the first cell by demodulating the common control channel, so as to provide necessary information for subsequent possible service data demodulation. Therefore, a shared spectrum can be properly used in a form of cell configuration.

Optionally, the receiving unit 410 is specifically configured to receive the first notification message sent by the base station when the base station determines that the first cell is in an available state.

Figure 13:
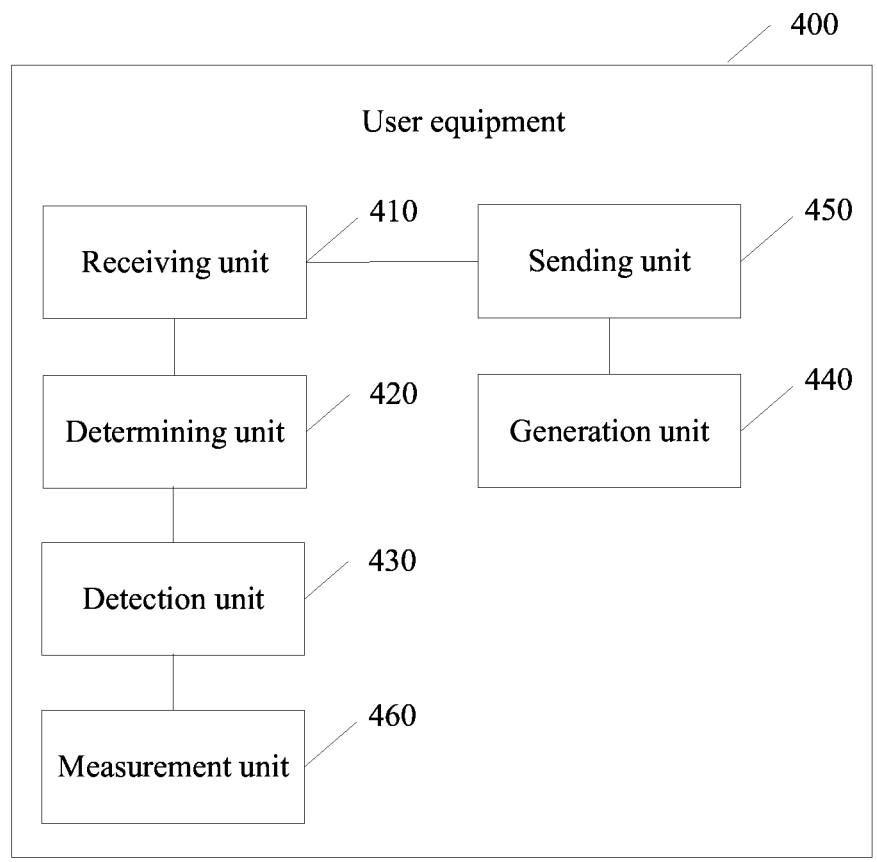
FIG. 13 is a schematic block diagram of user equipment according to another embodiment.

Optionally, the determining unit 420 is further configured to determine, according to energy detection and/or signal parsing, that the first cell is in an available state. As shown in FIG. 13, the user equipment further includes a generation unit 440 and a sending unit 450.

The generation unit 440 is configured to: after the determining unit 420 determines that the first cell is in an available state, generate a listening report message, where the listening report message is used by the base station to determine that the first cell is in an available state; and the sending unit 450 is configured to send the listening report message generated by the generation unit 440 to the base station.

Optionally, the receiving unit 410 is further configured to receive, over the first cell, service data sent by the base station.

Optionally, the receiving unit 410 is further configured to receive a second notification message sent by the base station on a spectrum corresponding to the first cell, where the second notification message is sent by the base station when the base station determines that synchronization performance of the user equipment cannot meet a synchronization requirement, and is used to instruct to detect a synchronization channel of a spectrum corresponding to the second cell on the spectrum corresponding to the second cell.

The determining unit 420 is further configured to determine, based on the second notification message received by the receiving unit 410, that the detection unit 430 needs to detect the synchronization channel of the spectrum corresponding to the second cell on the spectrum corresponding to the second cell; and the detection unit 430 is further configured to detect the synchronization channel of the spectrum corresponding to the second cell on the spectrum corresponding to the second cell.

Optionally, the receiving unit 410 is further configured to receive a third notification message sent by the base station over the second cell, where the third notification message is sent by the base station when the base station determines that common control information carried over the common control channel is updated, and the third notification message is used to instruct to detect an updated common control channel of the first cell in the first cell, and the updated common control channel is used to carry updated common control information; the determining unit 420 is further configured to determine, based on the third notification message received by the receiving unit 410, that the detection unit 430 needs to detect the updated common control channel in the first cell; and the detection unit 430 is further configured to detect the updated common control channel in the first cell.

Optionally, the detection unit 430 is specifically configured to periodically detect the common control channel in the first cell based on the first notification message received by the receiving unit 410.

The receiving unit 410 is further configured to receive a stop detection message sent by the base station over the second cell, where the stop detection message is sent by the base station when the base station determines that the first cell is occupied by another device, and is used to instruct to stop detecting the common control channel; the determining unit 420 is further configured to determine, based on the stop detection message received by the receiving unit 410, that the detection unit 430 needs to stop detecting the common control channel in the first cell; and the detection unit 430 is further configured to stop detecting the common control channel in the first cell.

Optionally, the receiving unit 410 is further configured to: after detecting the common control channel stops in the first cell, receive a fourth notification message sent by the base station when the base station determines that the first cell is in an available state, where the fourth notification message is used to instruct to detect the common control channel of the first cell in the first cell; the determining unit 420 is further configured to determine, based on the fourth notification message received by the receiving unit 410, that the detection unit 430 needs to periodically detect the common control channel in the first cell; and the detection unit 430 is further configured to periodically detect the common control channel in the first cell.

Optionally, the first notification message carries information required for demodulating the common control channel; the determining unit 420 is specifically configured to determine, based on the first notification message, that the detection unit 430 needs to detect the common control channel in the first cell based on the information required for demodulating the common control channel; and the detection unit 430 is specifically configured to detect the common control channel in the first cell based on the information required for demodulating the common control channel.

Optionally, the determining unit 420 is configured to determine, based on the first notification message received by the receiving unit 410, that the detection unit 430 needs to detect the common control channel in the first cell by means of blind detection; and the detection unit 430 is specifically configured to detect the common control channel in the first cell by means of blind detection.

Optionally, the common control channel includes at least one of the synchronization channel, a physical broadcast channel, a common control channel that carries a system information block, and a common control channel that carries a reference signal for performing measurement.

Optionally, as shown in FIG. 13, the user equipment 400 further includes a measurement unit 440, where the measurement unit 440 is configured to: when the common control channel detected by the detection unit 430 includes the common control channel that carries the reference signal for performing measurement, perform CSI measurement and/or RRM measurement according to the reference signal for performing measurement.

Optionally, the first notification message is carried by using physical layer signaling, and is carried in common search space of the second cell.

Optionally, the receiving unit 410 is specifically configured to receive the first notification message sent by the base station on a spectrum corresponding to the second cell, where the spectrum corresponding to the second cell is a licensed spectrum; and/or the determining unit 420 is specifically configured to determine that the detection unit 430 needs to detect the common control channel on a spectrum corresponding to the first cell; and the detection unit 430 is specifically configured to detect the common control channel on the spectrum corresponding to the first cell, where the spectrum corresponding to the first cell is an unlicensed spectrum.

Optionally, the second cell mentioned in this embodiment may be a primary cell (Primary cell, PCell) corresponding to the base station and/or the user equipment, and the first cell may be a secondary cell (SCell) corresponding to the base station and/or the user equipment. In this embodiment of the present invention, receiving a message (which may be specifically the first notification message, the second notification message, the third notification message, or the fourth notification message mentioned in the following) sent over the second cell is receiving the message sent on a spectrum corresponding to the second cell. Receiving a channel (which may be specifically the common control channel or a channel used to carry service data) by using the first cell is receiving the channel by using a spectrum corresponding to the first cell. The spectrum corresponding to the first cell may be an unlicensed spectrum, and/or the spectrum corresponding to the second cell may be a licensed spectrum. The spectrum corresponding to the first cell may be a shared spectrum jointly used by a device in an LTE system and another device, where the another device may be a WiFi device.

Optionally, the second cell and the first cell may belong to a same base station. For example, both the second cell and the first cell may belong to a same macro base station. The second cell and the first cell may also belong to different base stations. For example, the second cell belongs to a macro base station, and the first cell belongs to a base station (which is a base station with low transmit power) corresponding to a small cell. The small cell herein may include: a metro cell, a micro cell, a pico cell, a femto cell, a wireless local area network (WLAN) that uses a wireless fidelity (WiFi) technology, and the like. These small cells feature a small coverage area and low transmit power, and are capable of providing a high-speed data transmission service.

In this embodiment, the foregoing common control channel may include at least one of the synchronization channel, a physical broadcast channel, a common control channel that carries a system information block, and a common control channel that carries a reference signal for performing measurement. The system information block may be a system information block corresponding to a system information block type 1, or may be a system information block of another type. The reference signal for performing measurement may be a CSI-RS, a CRS, or a DRS.

In this embodiment, the above-mentioned notification message (which includes the first notification message, the second notification message, the third notification message, or the fourth notification message) may include information required for demodulating the common control channel. For example, the information required for demodulating the common control channel may include at least one of a resource location occupied by the common control channel, a modulation and coding scheme used for the common control channel, and transmit power information of the common control channel.

Specifically, when the common control channel includes the synchronization channel, the information required for demodulating the common control channel may include a time domain location, a frequency domain location, and a code domain location that are of a synchronization signal carried over the synchronization channel, a sequence form of the synchronization signal, and the like. For another common control channel than the synchronization channel, the information required for demodulating the common control channel may include a time domain location and a frequency domain location that are occupied by the another common control channel, a sequence resource, a used modulation and coding scheme, transmit power information, and the like.

In this embodiment, the information required for demodulating the common control channel and the information used to instruct the user equipment in the user equipment set to detect the common control channel of the first cell in the first cell may be carried in a same notification message, or may be carried in different notification messages. For example, the above-mentioned first notification message may include multiple notification messages, where one notification message carries the information used to instruct the user equipment in the user equipment set to detect the common control channel of the first cell in the first cell, and another notification message includes the information required for demodulating the common control channel. Alternatively, the first notification message may include only the information used to instruct the user equipment in the user equipment set to detect the common control channel of the first cell in the first cell.

In this embodiment, the above-mentioned notification message (which includes the first notification message, the second notification message, the third notification message, or the fourth notification message) may be carried by using at least one of physical layer signaling, radio resource control (RRC) broadcast signaling, RRC dedicated signaling, and Media Access Control (MAC) signaling.

In this embodiment, when the foregoing notification message (which includes the first notification message, the second notification message, the third notification message, or the fourth notification message) is carried by using the physical layer signaling, the notification message may be carried in common search space of the second cell. In this embodiment of the present invention, the notification message is carried by using the physical layer signaling, which can implement fast sending of the notification message; and the notification message is carried in the common search space of the second cell, so that a group of user equipments, such as all served user equipments or a group of user equipments that have a multi-carrier aggregation capability, can identify the notification message, without a need of separately sending the notification message to particular user equipment, thereby reducing signaling overheads. Certainly, in this embodiment of the present invention, when the foregoing notification message (which includes the first notification message, the second notification message, the third notification message, or the fourth notification message) is carried by using the physical layer signaling, the notification message may also be carried in user equipment-specific search space. That is, the base station may separately send the notification message carried by using the physical layer signaling to single user equipment, and add the notification message into each user equipment-specific search space.

In this embodiment, the foregoing notification message (which includes the first notification message, the second notification message, the third notification message, or the fourth notification message) may be referred to as cross-carrier scheduling signaling, common control signaling, or the like. Regardless of the name, a notification message falls within the protection scope of the present invention provided that the notification message can meet the function that is mentioned in the present invention and used to instruct the user equipment in the user equipment set to detect the common control channel of the first cell in the first cell.

The above-mentioned notification message may further carry carrier activation information. For example, when receiving the foregoing notification message, the user equipment may consider that a carrier is activated. The carrier herein (such as the first cell) may be identified by the user equipment by means of predefinition. The notification message that carries the carrier activation information may also be another notification message than the first notification message, the second notification message, the third notification message, and the fourth notification message, for example, a fifth notification message. The fifth notification message may be sent before the first notification message, the second notification message, the third notification message, or the fourth notification message is sent, that is, the base station first activates the first cell for the user equipment by using the fifth notification message, so that the user equipment can identify the first cell, and then instructs, by using the first notification message, the second notification message, the third notification message, or the fourth notification message, the user equipment to detect the common control channel sent over the first cell. Alternatively, the fifth notification message may be sent after the first notification message, the second notification message, the third notification message, or the fourth notification message is sent, and before the user equipment is instructed to demodulate service data, that is, the base station first instructs, by using the first notification message, the second notification message, the third notification message, or the fourth notification message, the user equipment to detect the common control channel sent over the first cell, then sends the fifth notification message to activate the first cell for the user equipment, and instructs the user equipment to detect the service data sent over the first cell, where the detection herein may be understood as demodulation, and the service data may be, for example, data carried over a PDSCH.

It should be understood that the carrier activation information is information that enables the user equipment to identify a carrier. The carrier activation information mentioned in this embodiment of the present invention is information that enables the user equipment to identify the first cell. The carrier activation information may also be referred to as carrier activation indication information. Regardless of the name, carrier activation information falls within the protection scope of the present invention provided that the carrier activation information can be used to implement the foregoing function.

The above-mentioned notification message may further carry information about an operator of the first cell, so that the user equipment can learn the information about the operator of the first cell by receiving the notification message.

In this embodiment, the foregoing user equipment set may be a set of all user equipments served by the base station; or may be a set of particular user equipments, for example, one or more user equipments that currently have relatively large service data volumes. If the user equipment in the foregoing user equipment set is particular user equipment, the foregoing notification message may be carried by using RRC dedicated signaling.

It should be understood that the user equipment 400 may be corresponding to the user equipment in the method 100 or 200, and may implement corresponding functions implemented by the user equipment in the method 100 or 200. For brevity, details are not described herein again.

Therefore, in this embodiment, a base station sends, to user equipment by using a second cell, a notification message used to instruct to detect a common control channel in a first cell, which can notify in time the user equipment that the first cell is used, and specifically, notify the user equipment that the base station needs to send the common control channel over the first cell; the base station sends the common control channel over the first cell, so that the user equipment detects the common control channel in the first cell; and the user equipment can acquire common control information of the first cell by demodulating the common control channel, so as to provide necessary information for subsequent possible service data demodulation. Further, only when determining that the first cell is in an available state, the base station sends, to the user equipment by using the second cell, the notification message used to instruct to detect the common control channel in the first cell, and sends the common control channel to the user equipment by using the first cell. Therefore, mutual interference between the base station and another device such as a WiFi device can be avoided, and the another device can also obtain more resource contention opportunities. Therefore, a shared spectrum can be properly used in a form of cell configuration.

Figure 14:
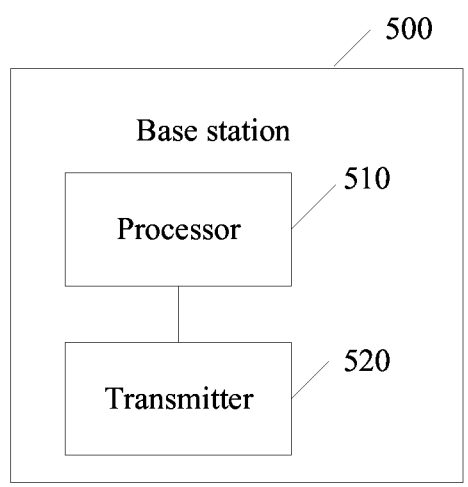
FIG. 14 is a schematic block diagram of a base station according to another embodiment.

FIG. 14 is a schematic block diagram of a base station 500 according to an embodiment of the present invention. As shown in FIG. 14, the base station 500 includes a processor 510 and a transmitter 520, where the processor 510 is configured to generate a first notification message, where the first notification message is used to instruct user equipment in a user equipment set to detect a common control channel of a first cell in the first cell; and the transmitter 520 is configured to send, by using a second cell, the first notification message generated by the processor 510 to the user equipment in the user equipment set, and send the common control channel to the user equipment in the user equipment set by using the first cell.

Therefore, in this embodiment, a base station sends, to user equipment by using a second cell, a notification message used to instruct to detect a common control channel in a first cell, which can notify in time the user equipment that the first cell is used, and specifically, notify the user equipment that the base station needs to send the common control channel over the first cell; the base station sends the common control channel over the first cell, so that the user equipment detects the common control channel in the first cell; and the user equipment can acquire common control information of the first cell by demodulating the common control channel, so as to provide necessary information for subsequent possible service data demodulation. Therefore, a shared spectrum can be properly used in a form of cell configuration.

Optionally, before the transmitter 520 sends the first notification message to the user equipment in the user equipment set by using the second cell, the processor 510 is further configured to determine that the first cell is in an available state.

Optionally, the transmitter 520 is further configured to: after the processor 510 determines that the first cell is in an available state, send a preoccupied signal over the first cell.

Figure 15:
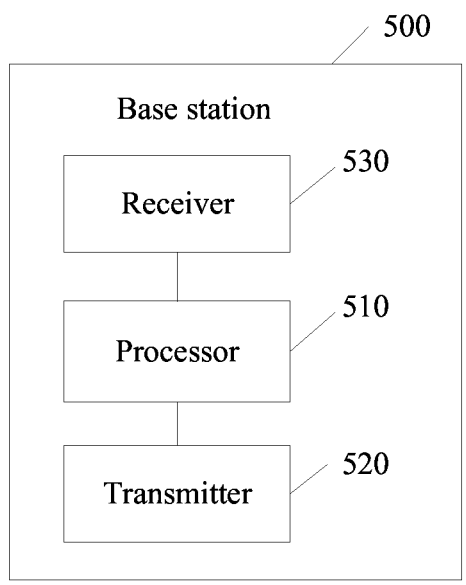
FIG. 15 is a schematic block diagram of a base station according to another embodiment.

Optionally, as shown in FIG. 15, the base station 500 further includes a receiver 530, and the processor 510 is specifically configured to determine, by performing energy detection and/or signal parsing on a signal received by the receiver 530, that the first cell is in an available state.

Optionally, as shown in FIG. 15, the base station 500 further includes a receiver 530, where the receiver 530 is configured to receive a listening report message sent by first user equipment in the user equipment set when the first user equipment determines, according to energy detection and/or signal parsing, that the first cell is in an available state; and the processor 510 is specifically configured to determine, according to the listening report message received by the receiver 530, that the first cell is in an available state.

Optionally, the processor 510 is further configured to: before the transmitter 520 sends the first notification message to the user equipment in the user equipment set by using the second cell, determine that service data needs to be sent to the user equipment in the user equipment set by using the first cell.

The transmitter 520 is further configured to: after sending the common control channel to the user equipment in the user equipment set, send the service data to the user equipment in the user equipment set by using the first cell.

Optionally, the processor 510 is further configured to: when the common control channel includes a synchronization channel, determine whether synchronization performance of the user equipment in the user equipment set can meet a synchronization requirement; and when determining that the synchronization performance of the user equipment in the user equipment set cannot meet the synchronization requirement, generate a second notification message, where the second notification message is used to instruct the user equipment in the user equipment set to detect the synchronization channel of the first cell in the first cell; and the transmitter 520 is further configured to send, by using the second cell, the second notification message generated by the processor 510 to the user equipment in the user equipment set, and send the synchronization channel to the user equipment in the user equipment set by using the first cell.

Optionally, the processor 510 is further configured to determine that common control information carried over the common control channel is updated, and generate a third notification message, where the third notification message is used to instruct the user equipment in the user equipment set to detect an updated common control channel of the first cell in the first cell, and the updated common control channel is used to carry updated common control information; and the transmitter 520 is further configured to send, by using the second cell, the third notification message generated by the processor 510 to the user equipment in the user equipment set, and send the updated common control channel to the user equipment in the user equipment set by using the first cell.

Optionally, the transmitter 520 is specifically configured to periodically send the common control channel to the user equipment in the user equipment set; the processor 510 is further configured to determine whether the first cell is occupied by another device, and when the processor 510 determines that the first cell is occupied by the another device, generate a stop detection message, where the stop detection message is used to instruct the user equipment in the user equipment set to stop detecting the common control channel; and the transmitter 520 is further configured to send, by using the second cell, the stop detection message generated by the processor 510 to the user equipment in the user equipment set. Optionally, the processor 510 may determine, by performing energy detection and/or signal parsing on a signal received by the receiver 530, whether the first cell is occupied by another device. For specific implementation, reference may be made to descriptions in the method 100.

Optionally, the processor 510 is further configured to: after the transmitter 520 sends the stop detection message, determine that the first cell is in an available state, and generate a fourth notification message, where the fourth notification message is used to instruct the user equipment in the user equipment set to detect the common control channel of the first cell in the first cell; and the transmitter 520 is further configured to send, by using the second cell, the fourth notification message generated by the processor 510 to the user equipment in the user equipment set, and periodically send the common control channel to the user equipment in the user equipment set by using the first cell.

Optionally, the common control channel includes at least one of the synchronization channel, a physical broadcast channel, a common control channel that carries a system information block, and a common control channel that carries a reference signal for performing measurement.

Optionally, the first notification message is carried by using physical layer signaling, and is carried in common search space of the second cell.

Optionally, the transmitter 520 is specifically configured to send, by using a spectrum corresponding to the second cell, the first notification message generated by the processor 510 to the user equipment in the user equipment set, where the spectrum corresponding to the second cell is a licensed spectrum; and/or the transmitter 520 is specifically configured to send the common control channel to the user equipment in the user equipment set by using a spectrum corresponding to the first cell, where the spectrum corresponding to the first cell is an unlicensed spectrum.

Optionally, the second cell mentioned in this embodiment of the present invention may be a primary cell (PCell) corresponding to the base station and/or the user equipment, and the first cell may be a secondary cell (SCell) corresponding to the base station and/or the user equipment. In this embodiment of the present invention, sending a message (which may be specifically the first notification message, the second notification message, the third notification message, or the fourth notification message mentioned in the following) by using the second cell is sending a channel by using a spectrum corresponding to the second cell. Sending a channel (which may be specifically the common control channel or a channel used to carry service data) by using the first cell is sending a message by using a spectrum corresponding to the first cell. The spectrum corresponding to the first cell may be an unlicensed (unlicensed) spectrum, and/or the spectrum corresponding to the second cell may be a licensed (licensed) spectrum. The spectrum corresponding to the first cell may be a shared spectrum jointly used by a device in an LTE system and another device, where the another device may be a WiFi device.

Optionally, the second cell and the first cell may belong to a same base station. For example, both the second cell and the first cell may belong to a same macro base station. The second cell and the first cell may also belong to different base stations. For example, the second cell belongs to a macro base station, and the first cell belongs to a base station (which is a base station with low transmit power) corresponding to a small cell. The small cell herein may include: a metro cell, a micro cell, a pico cell, a femto cell, a wireless local area network (WLAN) that uses a wireless fidelity (WiFi) technology, and the like. These small cells feature a small coverage area and low transmit power, and are capable of providing a high-speed data transmission service.

In this embodiment, the foregoing common control channel may include at least one of the synchronization channel, a physical broadcast channel, a common control channel that carries a system information block, and a common control channel that carries a reference signal for performing measurement. The system information block may be a system information block corresponding to a system information block type 1, or may be a system information block of another type. The reference signal for performing measurement may be a CSI-RS, a CRS, or a DRS.

In this embodiment, the above-mentioned notification message (which includes the first notification message, the second notification message, the third notification message, or the fourth notification message) may include information required for demodulating the common control channel. For example, the information required for demodulating the common control channel may include at least one of a resource location occupied by the common control channel, a modulation and coding scheme used for the common control channel, and transmit power information of the common control channel.

Specifically, when the common control channel includes the synchronization channel, the information required for demodulating the common control channel may include a time domain location, a frequency domain location, and a code domain location that are of a synchronization signal carried over the synchronization channel, a sequence form of the synchronization signal, and the like. For another common control channel than the synchronization channel, the information required for demodulating the common control channel may include a time domain location and a frequency domain location that are occupied by the another common control channel, a sequence resource, a used modulation and coding scheme, transmit power information, and the like.

In this embodiment, the information required for demodulating the common control channel and the information used to instruct the user equipment in the user equipment set to detect the common control channel of the first cell in the first cell may be carried in a same notification message, or may be carried in different notification messages. For example, the above-mentioned first notification message may include multiple notification messages, where one notification message carries the information used to instruct the user equipment in the user equipment set to detect the common control channel of the first cell in the first cell, and another notification message includes the information required for demodulating the common control channel. Alternatively, the first notification message may include only the information used to instruct the user equipment in the user equipment set to detect the common control channel of the first cell in the first cell.

In this embodiment of the present invention, the above-mentioned notification message (which includes the first notification message, the second notification message, the third notification message, or the fourth notification message) may be carried by using at least one of physical layer signaling, radio resource control (RRC) broadcast signaling, RRC dedicated signaling, and Media Access Control (MAC) signaling.

In this embodiment, when the foregoing notification message (which includes the first notification message, the second notification message, the third notification message, or the fourth notification message) is carried by using the physical layer signaling, the notification message may be carried in common search space of the second cell. In this embodiment of the present invention, the notification message is carried by using the physical layer signaling, which can implement fast sending of the notification message; and the notification message is carried in the common search space of the second cell, so that a group of user equipments, such as all served user equipments or a group of user equipments that have a multi-carrier aggregation capability, can identify the notification message, without a need of separately sending the notification message to particular user equipment, thereby reducing signaling overheads. Certainly, in this embodiment, when the foregoing notification message (which includes the first notification message, the second notification message, the third notification message, or the fourth notification message) is carried by using the physical layer signaling, the notification message may also be carried in user equipment-specific search space. That is, the base station may separately send the notification message carried by using the physical layer signaling to single user equipment, and add the notification message into each user equipment-specific search space.

In this embodiment, the foregoing notification message (which includes the first notification message, the second notification message, the third notification message, or the fourth notification message) may be referred to as cross-carrier scheduling signaling, common control signaling, or the like. Regardless of the name, a notification message falls within the protection scope of the present invention provided that the notification message can meet the function that is mentioned in the present invention and used to instruct the user equipment in the user equipment set to detect the common control channel of the first cell in the first cell.

The above-mentioned notification message may further carry carrier activation information. For example, when receiving the foregoing notification message, the user equipment may consider that a carrier is activated. The carrier herein (such as the first cell) may be identified by the user equipment by means of predefinition. The notification message that carries the carrier activation information may also be another notification message than the first notification message, the second notification message, the third notification message, and the fourth notification message, for example, a fifth notification message. The fifth notification message may be sent before the first notification message, the second notification message, the third notification message, or the fourth notification message is sent, that is, the base station first activates the first cell for the user equipment by using the fifth notification message, so that the user equipment can identify the first cell, and then instructs, by using the first notification message, the second notification message, the third notification message, or the fourth notification message, the user equipment to detect the common control channel sent over the first cell. Alternatively, the fifth notification message may be sent after the first notification message, the second notification message, the third notification message, or the fourth notification message is sent, and before the user equipment is instructed to demodulate service data, that is, the base station first instructs, by using the first notification message, the second notification message, the third notification message, or the fourth notification message, the user equipment to detect the common control channel sent over the first cell, then sends the fifth notification message to activate the first cell for the user equipment, and instructs the user equipment to detect the service data sent over the first cell, where the detection herein may be understood as demodulation, and the service data may be, for example, data carried over a PDSCH.

It should be understood that the carrier activation information is information that enables the user equipment to identify a carrier. The carrier activation information mentioned in this embodiment is information that enables the user equipment to identify the first cell. The carrier activation information may also be referred to as carrier activation indication information. Regardless of the name, carrier activation information falls within the protection scope of the present invention provided that the carrier activation information can be used to implement the foregoing function.

The above-mentioned notification message may further carry information about an operator of the first cell, so that the user equipment can learn the information about the operator of the first cell by receiving the notification message.

In this embodiment, the foregoing user equipment set may be a set of all user equipments served by the base station; or may be a set of particular user equipments, for example, one or more user equipments that currently have relatively large service data volumes. If the user equipment in the foregoing user equipment set is particular user equipment, the foregoing notification message may be carried by using RRC dedicated signaling.

It should be understood that the base station 500 may be corresponding to the base station in the method 100 or 200, and may implement corresponding functions implemented by the base station in the method 100 or 200. For brevity, details are not described herein again.

Therefore, in this embodiment, a base station sends, to user equipment by using a second cell, a notification message used to instruct to detect a common control channel in a first cell, which can notify in time the user equipment that the first cell is used, and specifically, notify the user equipment that the base station needs to send the common control channel over the first cell; the base station sends the common control channel over the first cell, so that the user equipment detects the common control channel in the first cell; and the user equipment can acquire common control information of the first cell by demodulating the common control channel, so as to provide necessary information for subsequent possible service data demodulation. Further, only when determining that the first cell is in an available state, the base station sends, to the user equipment by using the second cell, the notification message used to instruct to detect the common control channel in the first cell, and sends the common control channel to the user equipment by using the first cell. Therefore, mutual interference between the base station and another device such as a WiFi device can be avoided, and the another device can also obtain more resource contention opportunities. Further, when determining that the first cell is in an idle state, the base station sends a preoccupied signal over the first cell, which can avoid that the first cell is occupied by another device. Therefore, a shared spectrum can be properly used in a form of cell configuration.

Figure 16:
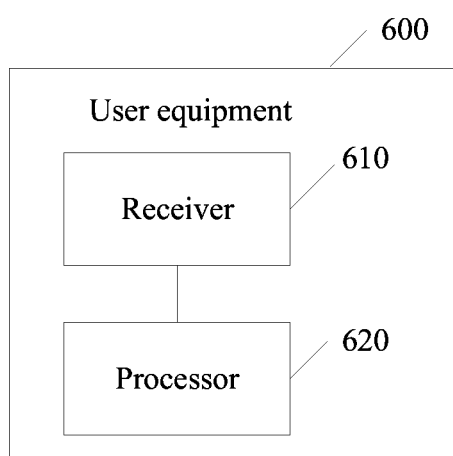
FIG. 16 is a schematic block diagram of user equipment according to another embodiment.

FIG. 16 is a schematic block diagram of user equipment 600 according to an embodiment. As shown in FIG. 16, the user equipment 600 includes a receiver 610 and a processor 620.

The receiver 610 is configured to receive a first notification message sent by a base station over a second cell, where the first notification message is used to instruct to detect a common control channel of a first cell in the first cell.

The processor 620 is configured to determine, based on the first notification message received by the receiver 610, that the common control channel needs to be detected in the first cell by using the receiver 610.

The processor 620 is further configured to detect the common control channel in the first cell by using the receiver 610.

Therefore, in this embodiment, a base station sends, to user equipment by using a second cell, a notification message used to instruct to detect a common control channel in a first cell, which can notify in time the user equipment that the first cell is used, and specifically, notify the user equipment that the base station needs to send the common control channel over the first cell; the base station sends the common control channel over the first cell, so that the user equipment detects the common control channel in the first cell; and the user equipment can acquire common control information of the first cell by demodulating the common control channel, so as to provide necessary information for subsequent possible service data demodulation. Therefore, a shared spectrum can be properly used in a form of cell configuration.

Optionally, the receiver 610 is specifically configured to receive the first notification message sent by the base station when the base station determines that the first cell is in an available state.

Figure 17:
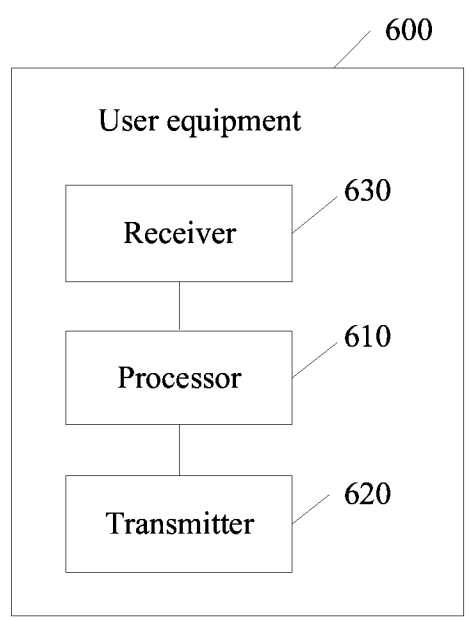
FIG. 17 is a schematic block diagram of user equipment according to another embodiment.

Optionally, the processor 620 is further configured to determine, by performing energy detection and/or signal parsing on a signal received by the receiver 610, that the first cell is in an available state, and generate a listening report message, where the listening report message is used to indicate that the first cell is in an available state. As shown in FIG. 17, the user equipment 600 further includes a transmitter 630, where the transmitter 630 is configured to: when the processor 620 determines that the first cell is in an available state, send the listening report message to the base station.

Optionally, the receiver 610 is further configured to receive, over the first cell, service data sent by the base station.

Optionally, the receiver 610 is further configured to receive a second notification message sent by the base station over the second cell, where the second notification message is sent by the base station when the base station determines that synchronization performance of the user equipment cannot meet a synchronization requirement, and is used to instruct to detect a synchronization channel of the first cell in the first cell; the processor 620 is further configured to determine, based on the second notification message received by the receiver 610, that the synchronization channel of the first cell needs to be detected in the first cell by using the receiver 610; and the processor 620 is further configured to detect the synchronization channel of the first cell in the first cell by using the receiver 610.

Optionally, the receiver 610 is further configured to receive a third notification message sent by the base station over the second cell, where the third notification message is sent by the base station when the base station determines that common control information carried over the common control channel is updated, and is used to instruct to detect an updated common control channel of the first cell in the first cell, and the updated common control channel is used to carry updated common control information; the processor 620 is further configured to determine, based on the third notification message received by the receiver 610, that the updated common control channel needs to be detected in the first cell by using the receiver 610; and the processor 620 is further configured to detect the updated common control channel of the first cell in the first cell by using the receiver 610.

Optionally, the processor 620 is specifically configured to determine, based on the first notification message received by the receiver 610, that the common control channel needs to be periodically detected in the first cell by using the receiver 610; the processor 620 is specifically configured to periodically detect the common control channel in the first cell by using the receiver 610; the receiver 610 is further configured to receive a stop detection message sent by the base station over the second cell, where the stop detection message is sent by the base station when the base station determines that the first cell is occupied by another device, and is used to instruct to stop detecting the common control channel; the processor 620 is further configured to determine, based on the stop detection message received by the receiver 610, that detecting the common control channel in the first cell by using the receiver 610 needs to stop; and the processor 620 is further configured to stop detecting, by using the receiver 610, the common control channel in the first cell.

Optionally, the receiver 610 is further configured to: after the processor 620 stops detecting, by using the receiver 610, the common control channel in the first cell, receive a fourth notification message sent by the base station when the base station redetermines that the first cell is in an available state, where the fourth notification message is used to instruct to detect the common control channel of the first cell in the first cell; the processor 620 is further configured to determine, based on the fourth notification message received by the receiver 610, that the common control channel needs to be periodically detected in the first cell by using the receiver 610; and the processor 620 is further configured to periodically detect the common control channel in the first cell by using the receiver 610.

Optionally, the first notification message carries information required for demodulating the common control channel; the processor 620 is specifically configured to determine, based on the first notification message received by the receiver 610, that the common control channel needs to be detected in the first cell by using the receiver 610 and based on the information required for demodulating the common control channel; and the processor 620 is further specifically configured to detect the common control channel in the first cell by using the receiver 610 and based on the information required for demodulating the common control channel.

Optionally, the processor 620 is specifically configured to detect the common control channel in the first cell by using the receiver 610, by means of blind detection, and based on the first notification message received by the receiver 610.

Optionally, the common control channel includes at least one of the synchronization channel, a physical broadcast channel, a common control channel that carries a system information block, and a common control channel that carries a reference signal for performing measurement.

Optionally, when the common control channel detected by the processor 620 by using the receiver 610 includes the common control channel that carries the reference signal for performing measurement, the processor 620 is further configured to perform CSI measurement and/or RRM measurement according to the reference signal for performing measurement.

Optionally, the first notification message is carried by using physical layer signaling, and is carried in common search space of the second cell.

Optionally, the receiver 610 is specifically configured to receive the first notification message sent by the base station on a spectrum corresponding to the second cell, where the spectrum corresponding to the second cell is a licensed spectrum; and/or the processor 620 is specifically configured to determine that the common control channel needs to be detected on a spectrum corresponding to the first cell by using the receiver 610, and detect the common control channel in the first cell by using the receiver 610, where the spectrum corresponding to the first cell is an unlicensed spectrum.

Optionally, the second cell mentioned in this embodiment may be a primary cell (Primary cell, PCell) corresponding to the base station and/or the user equipment, and the first cell may be a secondary cell (SCell) corresponding to the base station and/or the user equipment. In this embodiment of the present invention, receiving a message (which may be specifically the first notification message, the second notification message, the third notification message, or the fourth notification message mentioned in the following) sent over the second cell is receiving the message sent on a spectrum corresponding to the second cell. Receiving a channel (which may be specifically the common control channel or a channel used to carry service data) by using the first cell is receiving the channel by using a spectrum corresponding to the first cell. The spectrum corresponding to the first cell may be an unlicensed spectrum, and/or the spectrum corresponding to the second cell may be a licensed spectrum. The spectrum corresponding to the first cell may be a shared spectrum jointly used by a device in an LTE system and another device, where the another device may be a WiFi device.

Optionally, the second cell and the first cell may belong to a same base station. For example, both the second cell and the first cell may belong to a same macro base station. The second cell and the first cell may also belong to different base stations. For example, the second cell belongs to a macro base station, and the first cell belongs to a base station (which is a base station with low transmit power) corresponding to a small cell. The small cell herein may include: a metro cell, a micro cell, a pico cell, a femto cell, a wireless local area network (WLAN) that uses a wireless fidelity (WiFi) technology, and the like. These small cells feature a small coverage area and low transmit power, and are capable of providing a high-speed data transmission service.

In this embodiment, the foregoing common control channel may include at least one of the synchronization channel, a physical broadcast channel, a common control channel that carries a system information block, and a common control channel that carries a reference signal for performing measurement. The system information block may be a system information block corresponding to a system information block type 1, or may be a system information block of another type. The reference signal for performing measurement may be a CSI-RS, a CRS, or a DRS.

In this embodiment, the above-mentioned notification message (which includes the first notification message, the second notification message, the third notification message, or the fourth notification message) may include information required for demodulating the common control channel. For example, the information required for demodulating the common control channel may include at least one of a resource location occupied by the common control channel, a modulation and coding scheme used for the common control channel, and transmit power information of the common control channel.

Specifically, when the common control channel includes the synchronization channel, the information required for demodulating the common control channel may include a time domain location, a frequency domain location, and a code domain location that are of a synchronization signal carried over the synchronization channel, a sequence form of the synchronization signal, and the like. For another common control channel than the synchronization channel, the information required for demodulating the common control channel may include a time domain location and a frequency domain location that are occupied by the another common control channel, a sequence resource, a used modulation and coding scheme, transmit power information, and the like.

In this embodiment, the information required for demodulating the common control channel and the information used to instruct the user equipment in the user equipment set to detect the common control channel of the first cell in the first cell may be carried in a same notification message, or may be carried in different notification messages. For example, the above-mentioned first notification message may include multiple notification messages, where one notification message carries the information used to instruct the user equipment in the user equipment set to detect the common control channel of the first cell in the first cell, and another notification message includes the information required for demodulating the common control channel. Alternatively, the first notification message may include only the information used to instruct the user equipment in the user equipment set to detect the common control channel of the first cell in the first cell.

In this embodiment, the above-mentioned notification message (which includes the first notification message, the second notification message, the third notification message, or the fourth notification message) may be carried by using at least one of physical layer signaling, radio resource control (RRC) broadcast signaling, RRC dedicated signaling, and Media Access Control (MAC) signaling.

In this embodiment, when the foregoing notification message (which includes the first notification message, the second notification message, the third notification message, or the fourth notification message) is carried by using the physical layer signaling, the notification message may be carried in common search space of the second cell. In this embodiment, the notification message is carried by using the physical layer signaling, which can implement fast sending of the notification message; and the notification message is carried in the common search space of the second cell, so that a group of user equipments, such as all served user equipments or a group of user equipments that have a multi-carrier aggregation capability, can identify the notification message, without a need of separately sending the notification message to particular user equipment, thereby reducing signaling overheads. Certainly, in this embodiment, when the foregoing notification message (which includes the first notification message, the second notification message, the third notification message, or the fourth notification message) is carried by using the physical layer signaling, the notification message may also be carried in user equipment-specific search space. That is, the base station may separately send the notification message carried by using the physical layer signaling to single user equipment, and add the notification message into each user equipment-specific search space.

In this embodiment, the foregoing notification message (which includes the first notification message, the second notification message, the third notification message, or the fourth notification message) may be referred to as cross-carrier scheduling signaling, common control signaling, or the like. Regardless of the name, a notification message falls within the protection scope of the present invention provided that the notification message can meet the function that is mentioned in the present invention and used to instruct the user equipment in the user equipment set to detect the common control channel of the first cell in the first cell.

The above-mentioned notification message may further carry carrier activation information. For example, when receiving the foregoing notification message, the user equipment may consider that a carrier is activated. The carrier herein (such as the first cell) may be identified by the user equipment by means of predefinition. The notification message that carries the carrier activation information may also be another notification message than the first notification message, the second notification message, the third notification message, and the fourth notification message, for example, a fifth notification message. The fifth notification message may be sent before the first notification message, the second notification message, the third notification message, or the fourth notification message is sent, that is, the base station first activates the first cell for the user equipment by using the fifth notification message, so that the user equipment can identify the first cell, and then instructs, by using the first notification message, the second notification message, the third notification message, or the fourth notification message, the user equipment to detect the common control channel sent over the first cell. Alternatively, the fifth notification message may be sent after the first notification message, the second notification message, the third notification message, or the fourth notification message is sent, and before the user equipment is instructed to demodulate service data, that is, the base station first instructs, by using the first notification message, the second notification message, the third notification message, or the fourth notification message, the user equipment to detect the common control channel sent over the first cell, then sends the fifth notification message to activate the first cell for the user equipment, and instructs the user equipment to detect the service data sent over the first cell, where the detection herein may be understood as demodulation, and the service data may be, for example, data carried over a PDSCH.

It should be understood that the carrier activation information is information that enables the user equipment to identify a carrier. The carrier activation information mentioned in this embodiment is information that enables the user equipment to identify the first cell. The carrier activation information may also be referred to as carrier activation indication information. Regardless of the name, carrier activation information falls within the protection scope of the present invention provided that the carrier activation information can be used to implement the foregoing function.

The above-mentioned notification message may further carry information about an operator of the first cell, so that the user equipment can learn the information about the operator of the first cell by receiving the notification message.

In this embodiment, the foregoing user equipment set may be a set of all user equipments served by the base station; or may be a set of particular user equipments, for example, one or more user equipments that currently have relatively large service data volumes. If the user equipment in the foregoing user equipment set is particular user equipment, the foregoing notification message may be carried by using RRC dedicated signaling.

It should be understood that the user equipment 600 may be corresponding to the user equipment in the method 100 or 200, and may implement corresponding functions implemented by the user equipment in the method 100 or 200. For brevity, details are not described herein again.

Therefore, in this embodiment, a base station sends, to user equipment by using a second cell, a notification message used to instruct to detect a common control channel in a first cell, which can notify in time the user equipment that the first cell is used, and specifically, notify the user equipment that the base station needs to send the common control channel over the first cell; the base station sends the common control channel over the first cell, so that the user equipment detects the common control channel in the first cell; and the user equipment can acquire common control information of the first cell by demodulating the common control channel, so as to provide necessary information for subsequent possible service data demodulation. Further, only when determining that the first cell is in an available state, the base station sends, to the user equipment by using the second cell, the notification message used to instruct to detect the common control channel in the first cell, and sends the common control channel to the user equipment by using the first cell. Therefore, mutual interference between the base station and another device such as a WiFi device can be avoided, and the another device can also obtain more resource contention opportunities. Therefore, a shared spectrum can be properly used in a form of cell configuration.

A person of ordinary skill in the art may be aware that, in combination with the examples described in the embodiments disclosed in this specification, units and algorithm steps may be implemented by electronic hardware or a combination of computer software and electronic hardware. That the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a portable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An information transmission method, the method comprising:
    generating, by a processor of a transmitter, a first notification message, wherein the first notification message instructs a user equipment in a user equipment set to detect a common control channel of a first cell;
    sending, by the transmitter, a preoccupied signal over a first time-frequency area of the first cell, wherein the preoccupied signal comprises information indicating that the first time-frequency area of the first cell is occupied;
    sending, by the transmitter, the first notification message to the user equipment in the user equipment set using a second time-frequency area of a second cell; and
    sending, by the transmitter, the common control channel to the user equipment in the user equipment set using the first time-frequency area of the first cell.

2. The information transmission method according to claim 1, wherein the sending the preoccupied signal comprises determining that the first cell is in an available state.

3. The information transmission method according to claim 1, further comprising periodically sending the common control channel to the user equipment in the user equipment set;
    in response to determining that the first cell is occupied by another device, generating a stop detection message, wherein the stop detection message instructs the user equipment in the user equipment set to stop detecting the common control channel; and
    sending the stop detection message to the user equipment in the user equipment set using the second cell.

4. The information transmission method according to claim 1, wherein the common control channel comprises one or more of a synchronization channel, a physical broadcast channel, a second common control channel that carries a system information block, and a third common control channel that carries a reference signal for performing measurement.

5. The method according to claim 1, wherein generating the first notification message comprises:
    determining whether to send service data to the user equipment in the user equipment set; and
    in response to determining to send service data to the user equipment in the user equipment set, adding scheduling information to the first notification message, wherein the scheduling information instructs the user equipment to demodulate control information for data transmission over the first cell, and wherein the control information comprises a location of a time-frequency resource occupied during the data transmission, a modulation and coding scheme for the data transmission, and data power control information.

6. An information reception method, the method comprising:
    receiving, by a receiver, a first notification message sent by a base station over a second cell, wherein the first notification message instructs the receiver to detect a common control channel in a first time-frequency area of a first cell, wherein prior to the receiving, the base station having sent a preoccupied signal over the first time-frequency area of the first cell, and the preoccupied signal comprising information indicating that the first time-frequency area of the first cell is occupied;
    determining, by the receiver and based on the first notification message, that the common control channel needs to be detected in the first time-frequency area of the first cell; and
    detecting, by the receiver, the common control channel in the first time-frequency area of the first cell.

7. The information reception method according to claim 6, wherein the detecting the common control channel comprises:
    periodically detecting the common control channel in the first time-frequency area of the first cell;
    receiving, by the receiver from the base station, a stop detection message over the second cell, wherein the stop detection message is sent when the base station determines that the first cell is occupied by another device, and wherein the stop detection message instructs stopping detection of the common control channel; and
    stopping, in response to the stop detection message, detecting the common control channel in the first cell.

8. The information reception method according to claim 6, wherein the common control channel comprises one or more of a synchronization channel, a physical broadcast channel, a second common control channel that carries a system information block, and a third common control channel that carries a reference signal for performing measurement.

9. The information reception method according to claim 8, further comprising, in response to the common control channel comprising the third common control channel that carries the reference signal for performing measurement, performing channel state information (CSI) measurement or radio resource management (RRM) measurement according to the reference signal for performing measurement.

10. The information reception method according to claim 6, wherein the first notification message is carried using physical layer signaling and is carried in common search space of the second cell; or the first notification message is carried using physical layer signaling and is carried in user equipment-specific search space.

11. A base station, comprising:
a processor;
a non-transitory computer-readable storage medium storing a program to be executed by the processor, the program including instructions causing the processor to:
generate a first notification message, wherein the first notification message instructs a user equipment in a user equipment set to detect a common control channel of a first cell; and
a transmitter configured to, under control of the processor:
send a preoccupied signal over a first time-frequency area of the first cell, wherein the preoccupied signal comprises information indicating that the first time-frequency area of the first cell is occupied;
send, using a second time-frequency area of a second cell, the first notification message generated by the processor to the user equipment in the user equipment set; and
send the common control channel to the user equipment in the user equipment set using the first time-frequency area of the first cell.

12. The base station according to claim 11, wherein to send the preoccupied signal comprises determining that the first cell is in an available state.

13. The base station according to claim 11, wherein:
the transmitter is further configured to periodically send the common control channel to the user equipment in the user equipment set;
the program further includes instructions causing the processor to determine whether the first cell is occupied by another device, and in response to determining that the first cell is occupied by the another device, generate a stop detection message, wherein the stop detection message instructs the user equipment in the user equipment set to stop detecting the common control channel; and
the transmitter is further configured to send, using the second cell, the stop detection message generated by the processor to the user equipment in the user equipment set.

14. The base station according to claim 11, wherein the common control channel comprises one or more of a synchronization channel, a physical broadcast channel, a second common control channel that carries a system information block, and a third common control channel that carries a reference signal for performing measurement.

15. The base station according to claim 11, wherein to generate the first notification message comprises:
determine whether to send service data to the user equipment in the user equipment set; and
in response to determining to send service data to the user equipment in the user equipment set, add scheduling information to the first notification message, wherein the scheduling information instructs the user equipment to demodulate control information for data transmission over the first cell, and wherein the control information comprises a location of a time-frequency resource occupied during the data transmission, a modulation and coding scheme for the data transmission, and data power control information.

16. A user equipment, comprising:
a receiver, configured to receive, from a base station, a first notification message over a second cell, wherein the first notification message instructs the user equipment to detect a common control channel of a first cell in a first time-frequency area of the first cell, wherein prior to the receiving, the base station having sent a preoccupied signal over the first time-frequency area of the first cell, and the preoccupied signal comprising information indicating that the first time-frequency area of the first cell is occupied;
a processor; and
a non-transitory computer-readable storage medium storing a program to be executed by the processor, the program including instructions causing the processor to:
determine, based on the first notification message received by the receiver, that the common control channel needs to be detected in the first time-frequency area of the first cell using the receiver; and
detect the common control channel in the first time-frequency area of the first cell using the receiver.

17. The user equipment according to claim 16, wherein:
the program further includes instructions causing the processor to determine, based on the first notification message received by the receiver, that the common control channel needs to be periodically detected in the first time-frequency area of the first cell using the receiver; and periodically detecting the common control channel in the first cell using the receiver;
the receiver is further configured to receive, from the base station, a stop detection message over the second cell, wherein the stop detection message is sent in response to the base station determining that the first cell is occupied by another device, and wherein the stop detection message instructs the user equipment to stop detecting the common control channel; and
the program further includes instructions causing the processor to determine, based on the stop detection message received by the receiver, that detecting the common control channel in the first cell needs to stop; and stop detecting, using the receiver, the common control channel in the first cell.

18. The user equipment according to claim 16, wherein the common control channel comprises one or more of a synchronization channel, a physical broadcast channel, a second common control channel that carries a system information block, and a third common control channel that carries a reference signal for performing measurement.

19. The user equipment according to claim 18, wherein the program further includes instructions causing the processor to, in response to the common control channel comprising the third common control channel that carries the reference signal for performing measurement, perform channel state information (CSI) measurement or radio resource management (RRM) measurement according to the reference signal for performing measurement.

20. The user equipment according to claim 16, wherein the first notification message is carried using physical layer signaling, and is carried in common search space of the second cell; or the first notification message is carried using the physical layer signaling, and is carried in user equipment-specific search space.

* * * * *